United States Patent
Da Silva Pratas Gabriel et al.

(10) Patent No.: US 11,330,280 B2
(45) Date of Patent: May 10, 2022

(54) FRAME-LEVEL SUPER-RESOLUTION-BASED VIDEO CODING

(71) Applicants: KONINKLIJKE KPN N.V., Rotterdam (NL); NEDERLANDSE ORGANISATIE VOOR TOEGEPAST-NATUURWETEN-SCHAPPELIJK ONDERZOEK TNO, Is-Gravenhage (NL)

(72) Inventors: Alexandre Da Silva Pratas Gabriel, The Hague (NL); Emmanuel Thomas, Delft (NL)

(*) Notice: Subject to any disclaimer, the term of this patent is extended or adjusted under 35 U.S.C. 154(b) by 0 days.

(21) Appl. No.: 17/044,560

(22) PCT Filed: Apr. 12, 2019

(86) PCT No.: PCT/EP2019/059534
§ 371 (c)(1),
(2) Date: Oct. 1, 2020

(87) PCT Pub. No.: WO2019/197661
PCT Pub. Date: Oct. 17, 2019

(65) Prior Publication Data
US 2021/0099722 A1    Apr. 1, 2021

(30) Foreign Application Priority Data
Apr. 13, 2018 (EP) ..................... 18167361

(51) Int. Cl.
*H04N 19/33* (2014.01)
*H04N 19/119* (2014.01)
(Continued)

(52) U.S. Cl.
CPC ........... *H04N 19/33* (2014.11); *G06T 3/4046* (2013.01); *G06T 9/002* (2013.01); *H04N 19/105* (2014.11);
(Continued)

(58) Field of Classification Search
CPC .... H04N 19/33; H04N 19/119; H04N 19/159; H04N 19/176; H04N 19/177;
(Continued)

(56) References Cited

U.S. PATENT DOCUMENTS

| | | |
|---|---|---|
| 2010/0027678 A1 | 2/2010 | Alfonso |
| 2012/0294369 A1 | 11/2012 | Bhagavathy et al. |

(Continued)

FOREIGN PATENT DOCUMENTS

| | | | |
|---|---|---|---|
| WO | 2017/129568 | 8/2017 | |
| WO | WO-2017129568 A1 * | 8/2017 | ........... H04N 19/184 |

OTHER PUBLICATIONS

Sullivan, Gary J., et al. "Overview of the high efficiency video coding (HEVC) standard." IEEE Transactions on circuits and systems for video technology 22.12 (2012): 1649-1668 (Year: 2012).*

(Continued)

*Primary Examiner* — Tat C Chio

(57) ABSTRACT

A method of encoding a video frame into a bitstream is described including: applying a downsampling scheme to an original video frame of a first resolution for determining a first low-resolution, LR, original frame and one or more second original LR frames, the first LR original frame and the one or more second LR original frames being of a second resolution that is lower than the first resolution; partitioning the first LR original frame into first original blocks and partitioning the one or more second LR frames into second original blocks; using a prediction method for determining first predicted blocks, the first predicted blocks defining (Continued)

predictions for the first original blocks of the first LR original frame; determining first residual blocks based on the first predicted blocks and the first original blocks and, subsequently, determining first reconstructed blocks based on the first residual blocks and the first predicted blocks; determining second predicted blocks based on the first reconstructed blocks, the second predicted blocks defining predictions for the second original blocks of the one or more second LR original frames; determining second residual blocks based on the second predicted blocks and the second original blocks; and, transforming the first residual blocks and second residual blocks into a bitstream, the bitstream including metadata for signalling a decoder apparatus that during the encoding a downsampling scheme was used for downsampling the video frame.

17 Claims, 11 Drawing Sheets

(51) Int. Cl.
　　　*H04N 19/159*　　(2014.01)
　　　*H04N 19/176*　　(2014.01)
　　　*H04N 19/177*　　(2014.01)
　　　*H04N 19/184*　　(2014.01)
　　　*H04N 19/46*　　(2014.01)
　　　*H04N 19/105*　　(2014.01)
　　　*H04N 19/132*　　(2014.01)
　　　*H04N 19/30*　　(2014.01)
　　　*G06T 3/40*　　(2006.01)
　　　*G06T 9/00*　　(2006.01)

(52) U.S. Cl.
　　　CPC ......... *H04N 19/119* (2014.11); *H04N 19/132* (2014.11); *H04N 19/159* (2014.11); *H04N 19/176* (2014.11); *H04N 19/177* (2014.11); *H04N 19/184* (2014.11); *H04N 19/30* (2014.11); *H04N 19/46* (2014.11)

(58) Field of Classification Search
　　　CPC ...... H04N 19/184; H04N 19/46; H04N 19/59; H04N 19/11; H04N 19/593; H04N 19/147; H04N 19/70
　　　See application file for complete search history.

(56) References Cited

U.S. PATENT DOCUMENTS

| | | |
|---|---|---|
| 2015/0103886 A1 | 4/2015 | He et al. |
| 2015/0161772 A1 | 6/2015 | Greiner et al. |
| 2016/0127728 A1* | 5/2016 | Tanizawa ............... H04N 19/30 375/240.02 |
| 2017/0251222 A1 | 8/2017 | Ye et al. |
| 2018/0007367 A1 | 1/2018 | Zeng et al. |
| 2019/0253704 A1 | 8/2019 | Mao et al. |

OTHER PUBLICATIONS

Xu, Xiaozhong, et al. "Intra block copy in HEVC screen content coding extensions." IEEE Journal on Emerging and Selected Topics in Circuits and Systems 6.4 (2016): 409-419 (Year: 2016).*
The International Search Report (ISR) with Written Opinion for PCT/EP2019/059534 dated Jul. 11, 2019, pp. 1-17.
Vitali, Andrea et al. "Low-Complexity Standard-Compatible Robust and Scalable Video Streaming over LossyNariable Bandwidth Networks" 2005 Digest of Technical Papers International Conference On Consumer Electronics (IEEE Cat. No. 05CH37619) IEEE Piscataway (2005), pp. 7-8.
Venugopal, Gayathri et al. "Fast Template Matching for Intra Prediction" IEEE International Conference On mage Processing (ICIP), IEEE (2017), pp. 1692-1696.
Xu, Xiaozhong et al. "Intra block copy in HEVC screen content coding extensions" IEEE Journal On Emerging and Selected Topics In Circuits And Systems (2016) vol. 6(4), pp. 409-419.
Anggelos K. Katsaggelos, Rafael Molina and Javier Mateos, Super Resolution of Images and Video, Synthesis Lectures on Image, Video and Multimedia Processing #7, 2007 by Morgan & Claypool.
Xin Li et al., Multiple Description ImageCoding For Scalable and Robust Transmission over IP, Proceedings of the 6thWorld Congress on Intelligent Control and Automation, Jun. 21-23, 2006, Dalian, China, U.S.A., IEEE, Oct. 23, 2006, pp. 9996-10000.
Tan, Yih Han et al. "Intra Coding With Adaptive Partial Reconstruction" IEEE Transactions on Circuits and Systems fo Video Technology (2013) vol. 23(2), pp. 273-279.
Tan Yih Han et al. "Intra-prediction with adaptive sub-sampling" Joint Collaborative Team On Video Coding (JCT-VC) of ITU-T SG16WP3 and SO/IEC JTC1/SC29/WG11, 2nd Meeting: Geneva, CH Jul. 21-28, 2010.
Partial European Search Report for EP Application No. 18 167 361.7 dated Oct. 15, 2018, pp. 1-10.
Japanese Office Action in Japanese Patent Application No. 2018-538752, dated Oct. 7, 2019.
ITU-T H.261 Line Transmission of Non-Telephone Signals Video Codec for Audiovisual services at p x 64 kbits Mar. 1, 1993 (Mar. 1, 1993). pp. i.1-25. XP055224103. Retrieved from the Internet: URL:https://webcache.googleusercontenl.com/search?q= cache:me39L ENMcJ:hllps://www.itu.int/rec/dologin_pub-asp% 3Flang%3De%26idYo3DT-REC-H .261-199303-1 !! PDF-E% 26type%3Ditems+&cd=1 &hl=en&ct=clnk&gl=nl&client=firefox-b-ab retrieved on Oct. 28, 2015.
Park, Sung Cheol et al., "Super-Resolution Image Reconstruction: A Technical Overview", IEEE Signal Processing Magazine, May 2003, pp. 21-36.
Viitali et al. "Low-complexity standard-compatible robust and scalable video streaming over lossy/variable bandwidth networks," 2005 Digest of Technical Papers, International Conference on Consumer Electronics (IEEE Cat. No. 05CH37619) IEEE Piscataway, NJ, USA, Jan. 8, 2005, pp. 7-8, XP010796504 (Year: 2005).
Sung Cheol Park, Min Kyu Park, and Moon Gi Kang, "Super-Resolution Image Reconstruction: A Technical Overview," IEEE Signal Processing Magazine, May 2003.
Marco Folli, Lorenzo Favalli, and Matteo Lanati, Parameters optimization for a scalable multiple description coding scheme based on spatial subsampling, Mobimedia 2008, Oulu, Finland.
Heiko Schwarz, Detlev Marpe, and Thomas Wiegand, MCTF and Scalability Extension of H.264/AVC,n Proc. Picture Coding Symposium, Jan. 2004.
Text of ISO/IEC FDIS 23008-2:201X (2nd edition update), Draft ISO/IEC 23008-2:201x(E), ISO/IEC JTC1/SC29/WG11N14700, Jul. 2014, Sapporo, Japan.
European Office Action in Application No. 17 700 870.3-1208, dated Apr. 2, 2020.
European Search Report, European Patent Application No. 16152562. 1, dated Mar. 21, 2016, 4 pages.
PCT International Search Report and Written Opinion, PCT International Application No. PCT/EP2017/051438, dated Apr. 7, 2017, 13 pages.
Minoo, Koohyar et al., "Spatial Scalability for HEVC", Joint Collaborative Team on Video Coding (JCT-VC) of ITU-T SG 6 WP3 and ISO/IEC JTC1/SC29/WG11, 5th Meeting, Genneva, Switzerland, Mar. 16-23, 2011, pp. 1-14.
Vandeventer, Oskar M. et al., "Proposed White Paper on MPEG DASH part 1 AMO 2", International Organisation or Standardisation, ISO/IEC JTC1/SC29/WG11, MPEG 2015, Geneva Switzerland, Oct. 19, 2015, 3 pages.

* cited by examiner

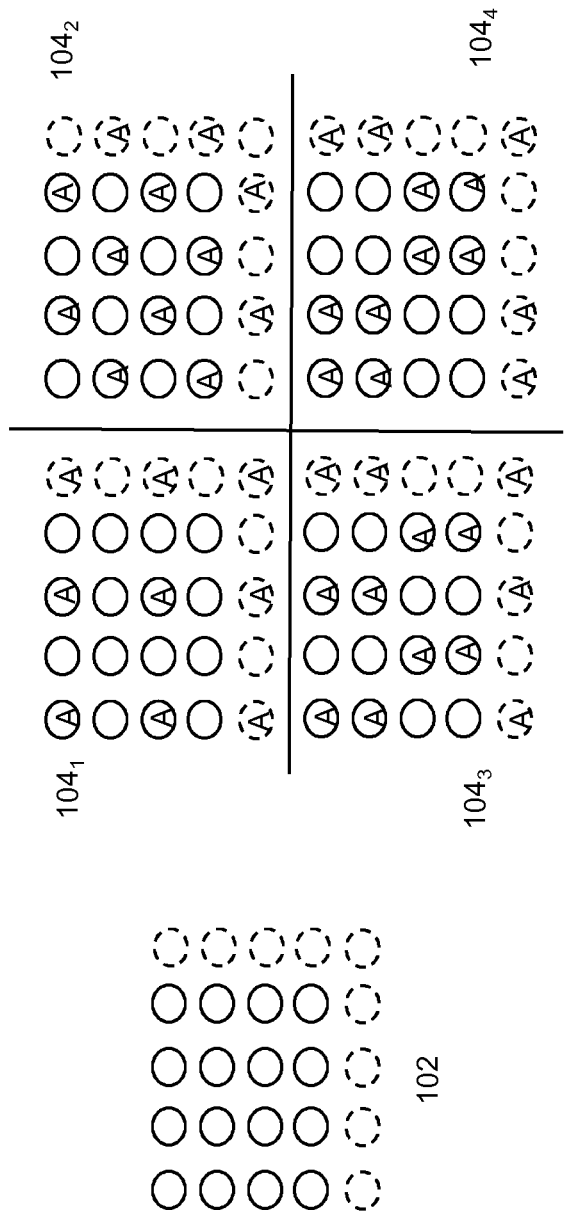
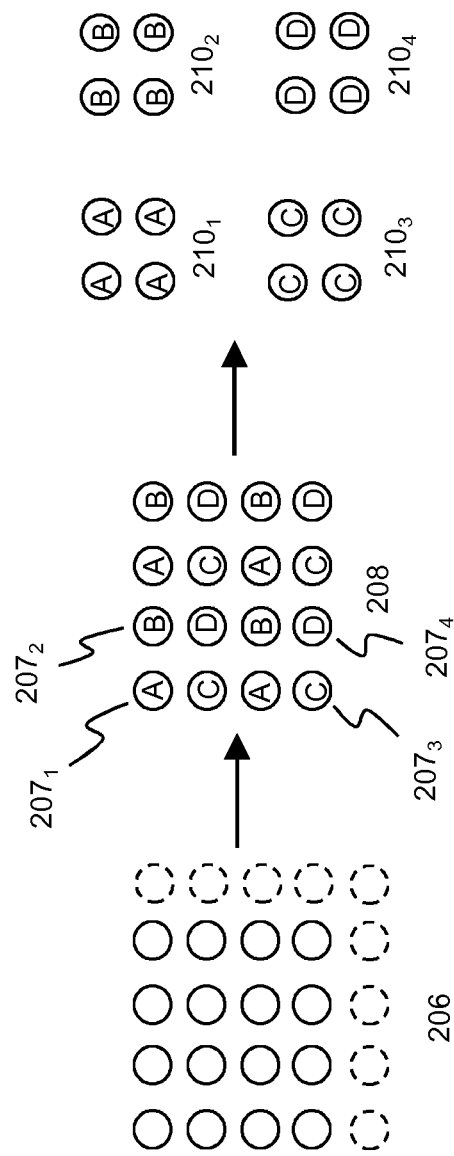
FIG. 1
FIG. 2

FRAME-LEVEL SUPER-RESOLUTION-BASED VIDEO CODING

CROSS REFERENCE TO RELATED APPLICATIONS

The present application is a national stage entry of, and claims priority to, PCT/EP2019/059534, filed on Apr. 12, 2019, which claims priority to European Patent Application EP 18167361.7, filed in the European Patent Office on Apr. 13, 2018, both of which are hereby incorporated in their entirety herein by reference.

FIELD OF THE INVENTION

The invention relates to super-resolution based prediction for video coding, and, in particular, though not exclusively, to methods and systems for super-resolution based prediction for video coding, an encoder apparatus and a decoder apparatus comprising a module for super-resolution based prediction video coding and a computer program product for executing such methods.

BACKGROUND OF THE INVENTION

In video coding standardisation, the MPEG and ITU joint group have traditionally adopted a hybrid video coding system (e.g. AVC and HEVC). The hybrid system comprises a combination of motion-prediction and video block-based transform coding. Here, a video block (or in short a block) refers to a basic processing unit of a video standard. Video blocks are named differently in different coding standards, for example in H.264/AVC a block is referred to as a macroblock, in HEVC a block is referred to as a Coding Tree Unit (CTU) and in VP9 and AV1 a coding block is referred to as a super block. The hybrid video coding system aims at exploiting the redundancy of video samples in video frames. In particular, motion-prediction exploits temporal redundancy between consecutive frames and spatial correlation of pixels within a given frame, while a so-called transform coding decorrelates the signal components. Current state of the art coding standards such as HEVC, AV1 and the currently developed VVC (Versatile Video Coding) have substantially higher compression efficiencies when compared to other coding standards of previous generations such as H.264/AVC (MPEG-4 part 10).

Temporal prediction cannot be used in certain situations, e.g. in case of a first frame of a video sequence, in case a frame is a key frame (i.e. a frame from which decoding can be started in the middle of the compressed bitstream) or in case the correlation between two frames is too small (e.g. abrupt scene changes). In these cases, an intra-prediction scheme may be used in order to compress the frame at this position of the video sequence. Intra-prediction is based on previously coded blocks in the current frame and presupposed strong correlations between neighbouring pixels, i.e. "spatial redundancy" between pixels. This spatial redundancy may be present in both the luma and the chroma information of a video frame. For example, in soccer game images, adjacent pixels of a green pixel will mainly also be green. Also, generally, pixels adjacent to a dark pixel will also be dark, for example in shadow areas.

Typically, blocks in a video frame as processed in raster scan order starting, i.e. row by row, starting from the block in the left upper corner of the video frame. Thus, as predicting pixels of the current block will be based on previously coded samples of neighbouring blocks, typically blocks that are positioned above and/or at the left side of the current block. HEVC and AV1 have different types of intra prediction methods available for a macroblock, each type having its own modes. For example, for luma information there are different types of intra prediction: a prediction method for a 16×16 block (the entire macroblock), for a 8×8 block (four per macroblock) or for a 4×4 block (sixteen per macroblock). For the chroma information there is method wherein the prediction is performed based on one block for that macroblock.

Moreover, dependent on the type of prediction method, there are different modes available: different modes for 8×8 or 4×4 luma prediction, and different modes for 16×16 luma prediction and for chroma information. Each mode determines precisely how the values of the pixels in the current block are predicted based on earlier encoded pixel values in the neighbourhood of the current block that needs to be encoded. Due to the order in which the (macro)blocks are encoded, only the pixels of the block that is situated to the left or above the current block are available. When the encoder decides to predict a current block based on intra-prediction, it will select a type of intra-prediction and one of the modes that belongs to the intra-prediction type. The encoder will use the predicted block to determine a residual block, which is sent by the encoder together with information about the intra-prediction type and the associated mode to the decoder.

It is up to the encoder to select which type of intra prediction and which mode to use.

While the use of smaller block sizes in the prediction process probably will result in a more accurate prediction, there is also a larger overhead because the encoder needs to signal the chosen mode for a larger number of blocks in the bitstream. Typically, for more homogenous areas, the prediction will usually be performed based on the larger block (such as 16×16, 64×64 or even 128×128 blocks), and for the more detailed areas the prediction will usually be based on smaller blocks.

In certain situations, however, the presumption of strong correlations of the video signal between neighbouring pixels no longer holds. This may for example be the case for 360 video wherein such spatial correlations is no longer present or at least substantially reduced due to effects of projection on a 2D surface (EPR or cubic) such as geometry seams, i.e. cube faces arranged in a grid. Also in conventional 2D video coding, video signals can have naturally low correlation, e.g. natural scenes with large texture (grass, sand, vegetation, etc.), noise in video, every phenomenon that decreases to the correlation between two neighbouring pixels. Hence, in that case (video blocks of) I frames cannot be accurately predicted and thus efficiently compressed. This may seriously deteriorate the overall compression efficiency of the video signal as I frames may represent a significant part of the total data in a bitstream, sometimes even up to 80%.

More generally, for a certain correlation of the video signal in a region of a video frame that needs to be compressed, intra-prediction will provide efficient compression up to a certain size of the predicted video block of the video signal in that region, since the correlation decreases as the distance between two pixels increases Hence, from the above it follows that there is a need in the art for improved coding schemes that enable efficient video block coding, in particular efficient video block coding for high-resolution video.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In an aspect, the invention relates to a method of encoding a video frame into a bitstream, wherein the method may comprise: a processor of an encoding apparatus applying a downsampling scheme to an original video frame of a first resolution for determining a first low-resolution, LR, original frame and one or more second original LR frames, the first LR original frame and the one or more second LR original frames being of a second resolution that is lower than the first resolution; the processor partitioning the first LR original frame into first original blocks and partitioning the one or more second LR frames into second original blocks; the processor using a prediction method for determining first predicted blocks, the first predicted blocks defining predictions for the first original blocks of the first LR original frame; the processor determining first residual blocks based on the first predicted blocks and the first original blocks and, subsequently, determining first reconstructed blocks based on the first residual blocks and the first predicted blocks; the processor determining second predicted blocks based on the first reconstructed blocks, the second predicted blocks defining predictions for the second original blocks of the one or more second LR original frames; the processor determining second residual blocks based on the second predicted blocks and the second original blocks; and, the processor transforming the first residual blocks and second residual blocks into a bitstream, the bitstream including metadata for signalling a decoder apparatus that during the encoding a downsampling scheme was used for downsampling the video frame.

Thus, the invention regards an encoding method wherein a super resolution technique is used at a frame level for spatially subsample an original video frame in a plurality of low resolution versions. One of the low-resolution version may be encoded and decoded to determine a reconstructed low resolution frame which is used as a reference frame for determining predictions of the other low resolution versions. The encoding method is especially efficient in case the video frame includes pixel values with low spatial correlation.

In an embodiment, the video frame may be an I frame, wherein determining the first predicted blocks may include: using an intra-prediction method for determining the first predicted blocks. In an embodiment, the video frame may be an P frame or a B frame, wherein determining the first predicted blocks may include: using an inter-prediction method for determining the first predicted blocks. Thus, the encoding method may be applied both I frames or P or B frames.

In an embodiment, the first reconstructed blocks may define a first LR reconstructed frame, the first LR reconstructed frame defining a reference frame for determining the second predicted blocks.

In an embodiment, a block-matching prediction method may be used for determining the second predicted blocks. In an embodiment, the block-matching prediction method may be based on an intra region-based template matching method or a intra copy block method. Hence, techniques typically used for inter frame prediction known as block matching techniques may be used to determine these predictions. The Intra Block Copy (IBC) prediction mode known from the HEVC Screen Content Coding extension. Another block-matching technique that can be used is the Intra Region-based Template Matching technique.

In an embodiment, the first residual blocks associated with the first LR original frame and second residual blocks associated with the one or more second LR original frames may define a data structure, preferably a sub Group of Pictures, sub GOP, preferably the data structure being associated with metadata for the sub-GOP. A sub GOP is a Group of Pictures that refers to pictures of the same Super frame. In this case a sub GOP defines the different LR frames as different frames, with the first LR frame represents an I frame and the other LR frames may be of a known type, e.g. P or B or a new type to be defined.

In an embodiment, the downsampling scheme may be a polyphase downsampling scheme, the downsampling scheme including a plurality of spatial downsampling lattices, preferably four downsampling lattices. Any downsampling filter can be used as long as the downsampling operation performed is signalled to decoder so that the reconstruction of the high resolution frame can be optimised. In a particular case, the downsampling filter can be a polyphase downsampling. Polyphase downsampling gives the advantage that the 4 frames created from a high resolution original video frame contain the whole source information. The operation does not cause any data loss.

In an embodiment, the first LR original frame and the one or more second LR original frames may be spatially multiplexed into a multiplexed video frame of the first resolution. The LR frames may be are spatially multiplexed into one frame, so that the metadata about block partitioning can be reduced to the region corresponding the first LR frame (e.g. the left upper block in case of polyphase downsampling). The block portioning of the other LR frames may be considered the same as for the first LR frame.

Thus, the four LR frames of a polyphaser downsampled original video frame can either be treated as a single frame whose resolution is equal to the HR frames or the four phases can be treated as four (low-resolution) frames whose resolution is a ¼ of the HR frame.

In an embodiment, the metadata may include one or more first parameters for signalling the decoder apparatus the type of downsampling scheme that was used by the encoder apparatus. In an embodiment, the metadata may include one or more second parameters for signalling the decoder apparatus the type of prediction that was used for predicting the first predicted blocks. In an embodiment, the metadata may include one or more third parameters for signalling the decoder apparatus the type of prediction that was used for predicting the second predicted blocks. The fact that an original video frame is decomposed in different low-resolution frames and how it is decomposes can be signalled in the bitstream for each frame. For example, in an embodiment, a flag in a slice segment header (HEVC) or tile group header (VVC) can be define to express the downsampling in 4 polyphased phases. In other embodiment, the signalling can express the type of downsampling and the number of phases produced such that the decoder can revert the operation.

In an aspect, the invention may relate to a method of decoding a bitstream into a video frame, wherein the method may comprise: the processor of a decoding apparatus receiving a bitstream comprising first encoded residual blocks associated with a first low-resolution, LR, original frame and second encoded residual blocks associated with one or more second LR original frames; the processor receiving metadata associated with the first and second encoded residual blocks, the metadata signalling the decoder apparatus that the encoder apparatus used a downsampling scheme for downsampling an original frame of a first resolution into the first LR original frame and the one or more second LR original frames, the first LR original frame and the one or more second LR original frames being of a second resolution that is lower than the first resolution; the processor using a prediction method for determining first predicted blocks, the first predicted blocks defining predictions for the first original blocks of the first LR original frame; the processor transforming the first encoded residual blocks into first residual blocks and determining first reconstructed blocks based on the first residual blocks and the first predicted blocks, the first reconstructed blocks defining a first LR reconstructed frame; the processor determining second predicted blocks based the first reconstructed blocks, the second predicted blocks defining predictions for the second original blocks of the one or more second LR original frames; the processor transforming the second encoded residual blocks into second residual blocks and determining second reconstructed blocks based on the second residual blocks and the second predicted blocks, the second reconstructed blocks defining one or more second LR reconstructed frames; and, the processor determining a reconstructed original video frame based on the first LR reconstructed frame and the one or more second LR reconstructed frames.

In an embodiment, the determining the reconstructed blocks may include: upsampling the first LR reconstructed frame and the one or more second LR reconstructed frames, preferably the upsampling being based on an upsampling scheme that is associated with the downsampling scheme; and, combining the upsampled first LR reconstructed frame and the upsampled second LR reconstructed frame into the reconstructed original video frame.

In an embodiment, a block-matching prediction method may be used for determining the second predicted blocks, preferably the block-matching prediction method being based on an intra region-based template matching method or a intra copy block method.

In an embodiment, the bitstream may be a High Efficiency Video Coding, HEVC, based bitstream, Alliance for Open Media Video, AV1, based bitstream, or a Versatile Video Coding, VVC, based bitstream.

In an aspect, the invention may relate to an apparatus for encoding a video frame into a bitstream, wherein the apparatus may comprise: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations which may comprise: applying a downsampling scheme to an original video frame of a first resolution for determining a first low-resolution, LR, original frame and one or more second original LR frames, the first LR original frame and the one or more second LR original frames being of a second resolution that is lower than the first resolution; partitioning the first LR original frame into first original blocks and partitioning the one or more second LR frames into second original blocks; using a prediction method for determining first predicted blocks, the first predicted blocks defining predictions for the first original blocks of the first LR original frame; determining first residual blocks based on the first predicted blocks and the first original blocks and, subsequently, determining first reconstructed blocks based on the first residual blocks and the first predicted blocks; determining second predicted blocks based on the first reconstructed blocks, the second predicted blocks defining predictions for the second original blocks of the one or more second LR original frames; determining second residual blocks based on the second predicted blocks and the second original blocks; and, transforming the first residual blocks and second residual blocks into a bitstream, the bitstream including metadata for signalling a decoder apparatus that during the encoding a downsampling scheme was used for downsampling the video frame.

In an aspect, the invention may relate to an apparatus for decoding a bitstream into a video frame, wherein the apparatus may comprise: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations comprising: receiving a bitstream comprising first encoded residual blocks associated with a first low-resolution, LR, original frame and second encoded residual blocks associated with one or more second LR original frames; receiving metadata associated with the first and second encoded residual blocks, the metadata signalling the decoder apparatus that the encoder apparatus used a downsampling scheme for downsampling an original frame of a first resolution into the first LR original frame and the one or more second LR original frames, the first LR original frame and the one or more second LR original frames being of a second resolution that is lower than the first resolution; using a prediction method for determining first predicted blocks, the first predicted blocks defining predictions for the first original blocks of the first LR original frame; transforming the first encoded residual blocks into first residual blocks and determining first reconstructed blocks based on the first residual blocks and the first predicted blocks, the first reconstructed blocks defining a first LR reconstructed frame; determining second predicted blocks based the first reconstructed blocks, the second predicted blocks defining predictions for the second original blocks of the one or more second LR original frames; transforming the second encoded residual blocks into second residual blocks and determining second reconstructed blocks based on the second residual blocks and the second predicted blocks, the second reconstructed blocks defining one or more second LR reconstructed frames; and, determining a reconstructed original video frame based on the first LR reconstructed frame and the one or more second LR reconstructed frames.

In an aspect, the invention relates to an encoder apparatus configured to execute the method of encoding video data into a bitstream as described with reference to the embodiments described in this application.

In an aspect, the invention relates to a decoder apparatus configured to execute the method of decode a bitstream into video data as described with reference to the embodiments described in this application.

The invention may further relate to a computer program product comprising software code portions configured for, when run in the memory of a computer, executing the method steps according to any of method steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 1 depicts examples of spatial subsampling schemes that may be used in the embodiments described in this disclosure.

FIG. 2 an example of a polyphase subsampling scheme that may be used in the embodiments described in this disclosure.

DETAILED DESCRIPTION

Figure 3:
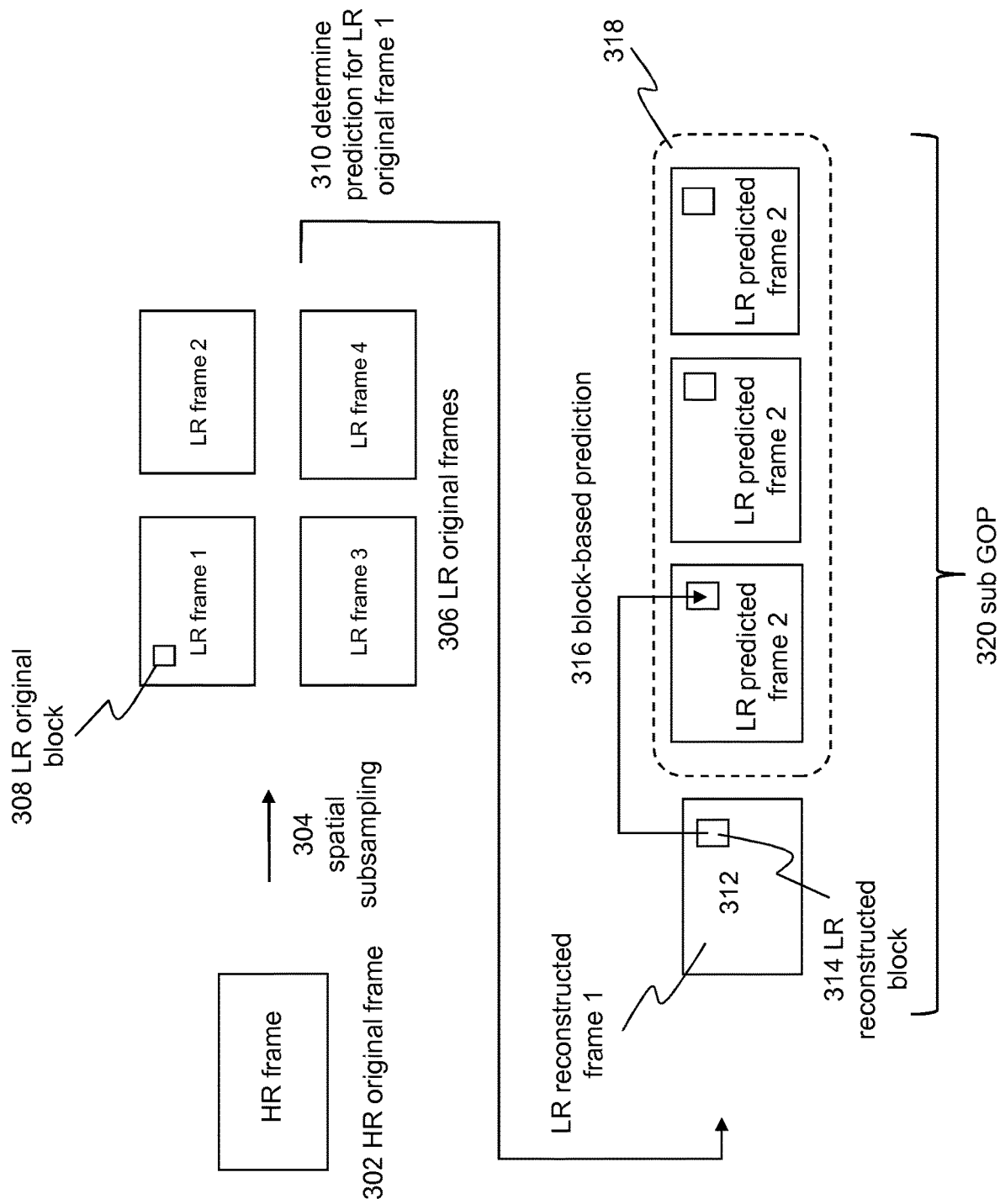
FIG. 3 depicts part of an encoding processes according to an embodiment of the invention.

It is an aim of the embodiments in this application to use a super resolution technique to compress and encode a video frame. The super resolution technique may be used during an in-loop coding process such that the encoder can encode downsampled frames of the original video frames. Hence, during the in-loop coding process, the encoder may encode frames of a lower resolution than the original video frame. The decision by the encoder whether to use the super resolution technique may be evaluated based on a cost function in a rate distortion optimisation (RDO) loop of the encoder. This way, efficient coding of high-resolution video frames, in particular high-resolution intra-coded (I) video frames, and video frames comprising video samples representing certain scenes that are hard to compress using conventional compression. Such video includes for example 360 video. The activation of the super resolution technique may be signalled in the bitstream so that the decoder can properly decode the bitstream and reconstruct the original video frames based on the decoded low-resolution video blocks.

In this disclosure, super-resolution processes may generally refer to image processing schemes for obtaining a high resolution (HR) image or a sequence of HR images based on a set of low resolution (LR) observations, e.g. images. These images may be coherent in time or not. For example, in a sequence of video frames, previous and subsequent video frames of a first resolution (e.g. standard definition or high resolution) may be used to reconstruct an image of a video frame of a second resolution (e.g. super resolution or 4K) in a video sequence. Super resolution processes primarily have been used to get spatial and temporal resolution enhancement when LR observations are generated with very little prior knowledge about their generation. For example, the spatial displacement between two LR observations may not be not known and need to be estimated. However, a super resolution process may also be used in a controlled and accurately defined environment. For example, during encoding, video frames can be downsampled using a predetermined downsampling scheme, e.g. polyphase downsampling, and super-resolution techniques may be used to construct a high-resolution image using upsampling the low-resolution frames and combining the upsampled low resolution frames into a high-resolution video frame. In that case, the super-resolution process can work optimal since the characteristics of the LR observations and their spatial and temporal relationships are known and do not need to be estimated.

FIGS. 1 and 2 depict examples of spatial subsampling schemes that may be used in the embodiments described in this disclosure. FIG. 1 depicts part of a video frame 102, e.g. a video block, that may be formed by sampling a part of a continuous image based on a (regular) sampling lattice, e.g. a high-resolution lattice or array of video samples. Here, each sampling point in the sampling lattice may form a video sample in the high-resolution video frame. Video samples may represent a particular colour component in an RGB or an YCbCr color scheme. For example, three RGB video samples may form one colour pixel in a video frame. Different types of low-resolution video frames may be formed based on the high-resolution frames of a high-resolution video signal by using different low-resolution sampling lattices $104_{1-4}$. Generally, a low-resolution sampling lattice has a lower sampling density than the sampling lattice of the high-resolution video frames. In downsampling operations known from e.g. scalable video coding standards such as Scalable Video Coding of AVC (SVC) and Scalable HEVC (SHVC), new pixel values of the video frames of the downsampled video signal be calculated based on sets of pixel values in the video frames of the original high-resolution video signal.

Certain downsampling schemes however do not change the pixels values. Such schemes may hereafter be referred to as spatial subsampling schemes. Such spatial subsampling schemes only select a subset of pixel values from a set of pixels values forming an image frame. A spatial subsampling scheme allows very efficient reconstruction of the original video signal or a low-resolution version thereof. Additionally, the spatially subsampled video frames of the resolution components allow the use of super resolution techniques for constructing a high-resolution video frame. It is noted that the sampling lattices shown in FIG. 1 should be considered as examples of a large number of different sampling lattices that may be used in the embodiments of this disclosure.

Video frames produced by such low-resolution sampling lattice may represent video frames of a resolution component. Different resolution components may be formed by subsampling high-resolution video frames based on different sampling lattices. A group of sampling lattices may be selected such that the resolution components generated based on this group of sampling lattices can be used to reconstruct the original high-resolution video signal, i.e. reconstruct a video signal that is identical or almost identical to original high-resolution video signal. Further, one or more spatial sampling lattices may be selected such that of the resolution components generated based on the one or more sampling lattices may be used to construct a low-resolution version of the high-resolution video signal.

In some embodiments, the sampling lattices used for subsampling a high-resolution video frame may have the same sampling density. Resolution components generated on such sampling lattices have the same resolution. In other embodiments (some of) the sampling lattices may have different sampling densities. In that case, (some of) the resolution components have different resolutions. Moreover, as shown in FIG. 1, in some embodiments, sampling lattices may have overlap, i.e. one or more sampling points in common. In other embodiment, there is no overlap between sampling lattices.

Hence, groups of resolution components may be generated based on spatial subsampling as depicted in FIG. 1. All the resolution components in the group may be used to reconstruct the original high-resolution video signal and some of the resolution components in the group may be used to construct one or more low resolution versions of a high-resolution video signal.

FIG. 2 depicts an example of a spatial subsampling scheme. In particular, the figure depicts a polyphase subsampling scheme for generating a number of video frames (in the example four) of first resolution based on pixels 202 of a video frame of a second resolution, wherein the second resolution is higher than the first resolution. In polyphase subsampling a 4×4 pixel matrix may be subsampled into four 2×2 resolution components $203_{1-4}$ wherein in the 4×4 pixel matrix each resolution component represents a spatially shifted 2×2 pixel matrix $206_{1-4}$. The four resolution components may form a group of resolution components (a resolution component group) that can be used by the decoder to reconstruct the original (high resolution) video signal.

A high-resolution video may have a YUV-type colour format, e.g. a YUV 4:2:0 colour format, each frame having 1920×1088 pixel resolution and frame rate of 24 frames per second (fps). Subjecting this high-resolution video frame to a polyphase spatial subsampling process with a factor 2 (applied to Y, U and V) would result in four low-resolution video frames of the YUV 4:2:0 colour format, wherein each frame has a 960×544 pixel resolution and a frame rate of 24 fps.

The polyphase subsampling scheme as depicted in FIG. 2 provides the advantage that it allows very fast operation at both encoder and decoder side, where pixel values are not changed. However, it may introduce visual artefacts due to spatial aliasing effects, if the original signal contains frequencies greater than twice the subsampling frequency. In that case, any of the four low-resolution components may not be proper for rendering. To mitigate this effect, a post-filtering operation may be applied to enhance the output frames of the resolution components and cancel as much as possible these visual artefacts. Also, a pre-filtering may be applied and revert to some extent in a post-filtering operation which can be efficiently applied with the knowledge of the applied degradation in the pre-filtering step.

For example, in an embodiment, the polyphase subsampling may be performed after low-pass filtering of the high-resolution frames. This way visual artefacts due to aliasing effect may be eliminated. When low-pass filtering, a post-processing step is needed to restore the original image before rendering. Otherwise at best, the reconstructed signal is the low pass version of the input signal. In lossless coding, reverting the low-pass filter to restore the HR image is doable to some extant with techniques such as inverse Wiener filter. In lossy coding, the low-pass filtering may introduce some difficulties, especially in a low-bitrate encoding when the reconstructed signal is already severely damaged by the compression. Such a post-processing restoration scheme may only provide an estimate of the high frequencies that have been removed by the low-pass filter but does not truly restore the original signal. That is, they do not reverse the degradation pixel-wise.

Although the generation of spatial components are described with reference to polyphase subsampling other types of spatial subsampling schemes may be also used. Examples of such schemes include quincunx and hexagonal subsampling or derivatives thereof. Based on such spatial subsampling schemes resolution components may be formed and use to reconstruct a high-resolution video.

From a high-resolution frame x, with N pixels (matrix N×1), a set of K low resolutions frames $y^{(k)}$, each with M pixels (matrix M×1), M<N. For each k-th low resolution frame $y^{(k)}$, the filtering of the HR frame is described by the matrix H (dimension N×N) and the subsampling is defined by the matrix A (dimension M×N). Thus, the generative model may be represented as:

$$y^{(k)}=A^{(k)}Hx$$

Here, it may be assumed that the same pre-filtering is applied to the HR frame as described above. In another embodiment, each k-th decomposition may have a matrix H. In yet another embodiment, one resolution component may have a matrix $H_{LP}$ that is a low-pass filter of the HR frame (hence avoiding visual artefact as Moiré effect) while the other resolution components have the same matrix $H_I$ which is the identity matrix, meaning that the HR frame is not filtered and a pure polyphase subsampling is performed.

Based on the above-described generative model, many reconstruction methods may be applied to produce $\hat{x}$, the estimation of the HR frame x using known super-resolution techniques as e.g. described in the article by Sung Cheol Park et. al., "*Super-Resolution image reconstruction: a technical overview*", IEEE signal processing magazine, May 2003, pp. 21-36, which is hereby incorporated by reference. Examples of super-Resolution image reconstruction algorithms described in this article that may be used to reconstruct the HR video frames include, non-uniform interpolation, reconstruction in the frequency domain, regularized super-resolution reconstruction, projection onto convex sets reconstruction, ML-POCS hybrid reconstruction, iterative back-projection reconstruction, adaptive filtering reconstruction and motionless super-resolution reconstruction.

In an embodiment, an original high-resolution video frame may be decomposed into a plurality of low-resolution frames using a polyphase subsampling operation as described in FIGS. 1 and 2. In that case, the process to recombine the subsampled low-resolution video frames is simpler than in the more general case. The recombination process boils down to mapping each low-resolution video frame onto the recombined picture according to the position the low-resolution video frame had in the original high-resolution signal. This recombination process includes upsampling each of the low-resolution video frames with zero padding and combining the upsampled low resolution video frame by spatially shifting the matrix element to match the position of the upsampled low resolution video frames in the video frame of the original high-resolution video frame.

It is noted that the subsampling schemes described above with reference to FIGS. 1 and 2 may be applied to various video signals, including (but limited to) a whole video frame or a part thereof, e.g. one or more blocks of video samples, video blocks, which are used during video coding.

In this application, a new coding mode for coding video frames based on a super resolution method is described. Here, video blocks are blocks of video samples that are processed by a functional element in a video encoder or decoder as one unit. In this application, the terms video block and block have the same meaning unless expressively stated otherwise. If during encoding, the encoder decides to compress and encode a video frame according to a super resolution mode, the decoder needs to know when these modes should be activated. Activation of the super-resolution mode may be signalled as metadata in the bitstream and can take many forms. For example, in an embodiment, a flag associated with a video frame, may signal a decoder whether the super-resolution mode is activated for a video frame.

In a traditional encoder, the frame type given to a certain frame of the video depends on the position in the group of picture (GOP) data structure (e.g. IPBBP . . . ). The predetermined sequence of different frame types in a GOP can be overridden by the encoder, especially professional-grade, based on content analysis. For example, when a scene transition occurs, it is preferable to start with an I frame since a P or B frame would be more expensive to encode, as previous frames will differ substantially upon a scene change.

The conventional frame types include I, P and B type frames, wherein an I-frame is intra coded and wherein the P-type and B-type are temporally predicted, respectively only backward and, backward and forward. Inside each video frame, each video block can further be defined into two types, intra-blocks and inter-blocks. An intra-block is coded using a spatial prediction scheme (within a frame), while inter-blocks are coded using a prediction scheme based on different video frames. Inside an I frame, all the video blocks are intra-coded. Inside P and B frames, it can happen that a video block is intra-coded because no other region in references frame was found to efficiently predict it. This may e.g. be the case, if in the video an object appears suddenly or in case of projected video frames of 360 video or more in general spherical video data.

The formation of 2D rectangular image frames or pictures based on spherical video data may typically include a projection of the spherical video data onto the surfaces of a geometrical object (an object having straight edges) and mapping of the projected surfaces onto a rectangular shape. For encoding spherical video content, a 2D rectangular video frame is the most convenient form for use as input to an encoder apparatus, as it does not require modifications to existing video coding standards. Different projection models, such as an equirectangular projection (ERP), cube or pyramid projection model are known. In case of ERP, a sphere is projected onto a rectangle using the polar angles as the horizontal and vertical coordinates. In this case, the mapping is incorporated in the projection step as the EPR projection directly results into a rectangular shape. Both the equirectangular and other projection formats can be directly encoded using encoding schemes, such as H.264/AVC, HEVC, AV1 or VVC.

It is further submitted that application of a super-resolution mode to a whole video frame, i.e. all blocks of the video frame, not only I frames to be encoded using a super resolution method, but also P and B frames, if rate-distortion optimisation (RDO) analysis shows that such mode is beneficial in terms of coding efficiency.

FIG. 3 depicts part of an encoding processes according to an embodiment of the invention. The process may be executed by an encoder apparatus. As shown in this figure, the process may start applying a spatial subsampling scheme 304, e.g. a polyphase downsampling scheme, to an original video frame of a first resolution 302, e.g. a high resolution (HR) type such as ultra-high resolution or a 4K resolution. Here, the original video frame may be any type of frame, including but not limited to an I frame, a P frame, a B frame or a superframe.

The application of the spatial subsampling may result in a plurality of low-resolution (LR) original video frames 306 of a second resolution that is lower than the first resolution. The plurality of LR original frames may include a first LR original frame and one or more second LR original frames. Then, a prediction 310 for a first LR original video frame of the plurality of LR original video frames may be determined. This prediction step may include determining predicted blocks for the original blocks of the first LR original frame using a known prediction method, e.g. an intra-prediction method in case of an I frame or an inter-prediction method in case of an P or a B frame.

In an embodiment, the original blocks may be processed separately. In an embodiment, the first LR original frame and the one or more second LR original frames may be spatially multiplexed into a multiplexed video frame of the first resolution. As a result, the multiplexed video frame will have a first resolution that is identical to the resolution of the original video frame. The multiplexed video frame may be divided in four parts, wherein the top left part may comprise the samples of the first original block and wherein the other parts (right top, left bottom, right bottom) may comprise samples of three (in case of polyphase downsampling) second original blocks.

The predicted blocks and the original blocks may be used to determine reconstructed blocks 314 of a LR reconstructed frame 312. The reconstructed blocks may be determined by determining residual blocks based on the original blocks and the predicted blocks, applying a quantization and transform step followed by a reverse transform and quantization step to produce LR reconstructed residual blocks. The reconstructed residual blocks and the predicted blocks are used to determine reconstructed blocks of a LR reconstructed frame 312. The reconstruction of this frame may be realized by a decoder loop in the encoder apparatus.

The LR reconstructed frame 312 may then be used as a LR reference frame in the determination of predictions for the one or more second LR original frames. In that case a block-matching prediction scheme 316 may be used to determine the predictions for the one or more second LR original frames, in this case LR predicted frames 318. A block matching prediction method refers to any block-based prediction method wherein a current block is predicted on the basis of a block (or blocks) from a reference frame (or reference frames) that closely match the current block. Such block-matching prediction scheme may be used to determine predicted blocks for the one or more second LR original frames based on reconstructed blocks 314 of the LR reconstructed frame (a reference frame) and, optionally, reconstructed blocks from one of the one or more second LR original frames that have already been decoded.

In an embodiment, the block-matching prediction scheme may be based on a so-called Intra Region-based Template Matching technique as described in the article by G. Venugopal, H. Schwarz, D. Marpe and T. Wiegand, "*Intra Region-based Template Matching*, JVET-J0039," San Diego, US, 2018, which is hereby incorporated by reference into this application. In another embodiment, a block-matching prediction scheme may be based on an intra block copy technique for predicting samples of an original block. An example of such intra copy block mode is described in the article by X. Xu et al., "*Intra Block Copy in HEVC Screen Content Coding Extensions*," in IEEE Journal on Emerging and Selected Topics in Circuits and Systems, vol. 6, no. 4, pp. 409-419, December 2016, doi: 10.1109/JET-CAS.2016.2597645, which is hereby incorporated by reference into this application.

The thus generated LR predictions 312,318 for the LR original frames 306 may be used to determine residual blocks which are quantized, transformed and entropy-encoded into a bitstream. As shown in the FIG. 3, the LR reconstructed frame and the one or more LR predicted frames may form a data structure, which may be referred to as a sub group of pictures 320 (a sub-GOP). Metadata associated with the sub GOP may include the type of spatial subsampling, the number of LR frames in a sub-GOP, the block partitioning for the first LR original frame, the prediction method that is used for determining predictions for the first LR original frame and the block-matching prediction method that is used for determining predictions for the one or more second LR original frames. These metadata may be included in the bitstream.

The prediction process described with reference to FIG. 3, may be referred to as a super resolution prediction mode, in particular a frame-level super resolution prediction mode, indicating that a downsampling scheme is used in the encoding process to downsample an original video frame into LR frames and an upsampling scheme is used in the decoding process to upsample decoded LR frames and combine the upsampled decoded LR frames into an reconstructed original video frame. The super-resolution prediction mode may be used to efficiently compression of frames that are difficult to compress using conventional prediction processes.

Figure 4B:
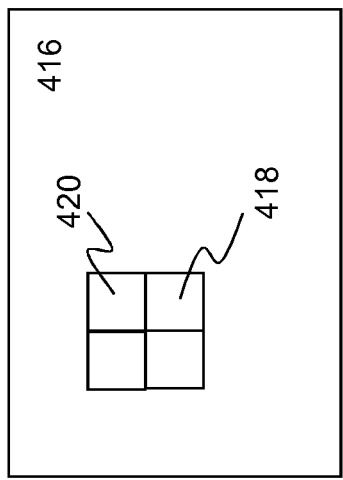
FIG. 4A-4C schematically depict the formation of a low-resolution reconstructed video block according to an embodiment of the invention.
Figure 4C:
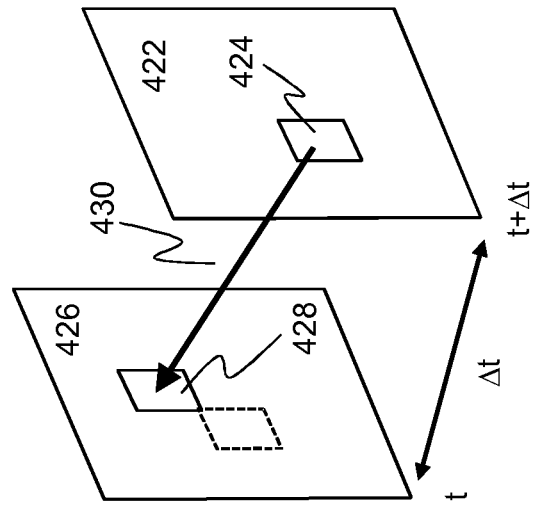
Figure 4A:
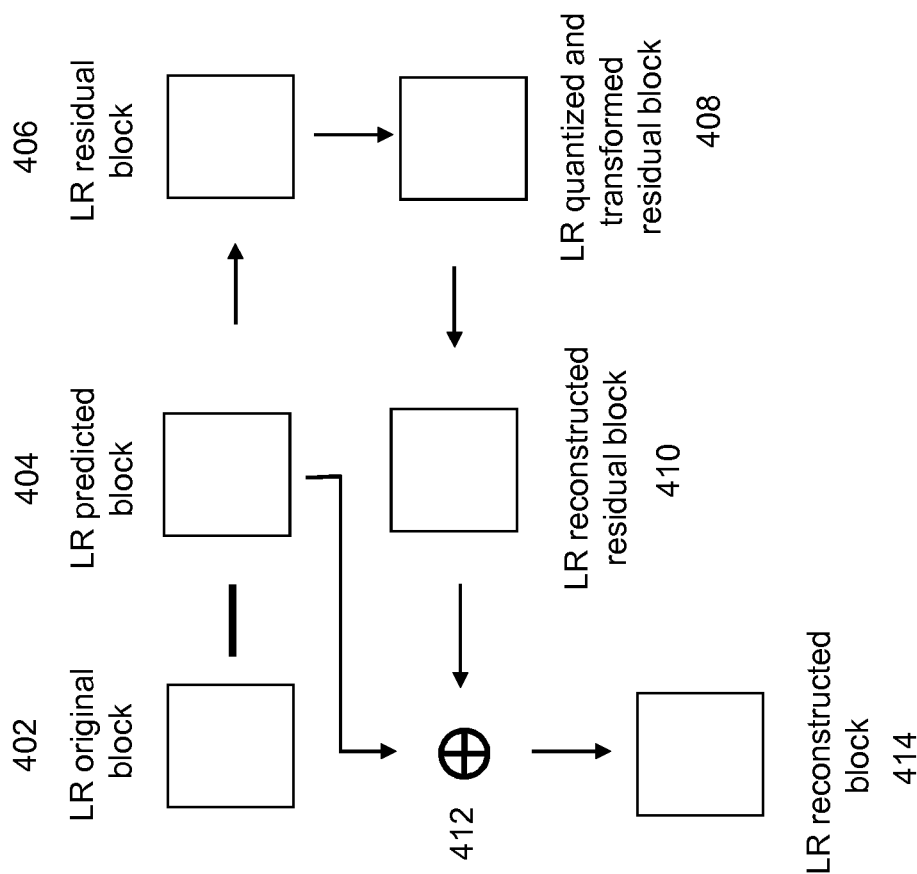

FIG. 4A-4C schematically depicts the formation of a reconstructed block of a LR reconstructed frame as described with reference to FIG. 3 in more detail. FIG. 4A depicts a original block of a LR original frame and a predicted block of a LR predicted frame. As described with reference to FIG. 3, samples of the original block may be predicted using a known prediction method. For example, these samples may be predicted based on reference samples, i.e. reconstructed samples, of blocks that already have been encoded. For example, in case the original video frame is an I frame, an intra-prediction method may be used as shown in FIG. 4B, wherein a current block 418 may be predicted based on reference samples (reconstructed samples) of blocks that already have been encoded (typically blocks that are located close to or bordering the current block). Any type of intra-prediction method may be used, e.g. intra-prediction modes known from video coding standards, such as HEVC, AV1 or any other known or future video coding standard. Alternatively, in case the original video frame is an P or a B frame, a known inter-prediction method may be used as shown in FIG. 4C, wherein a current block 424 of an original video frame 422 is predicted based on reconstructed samples of one or blocks of one or more already encoded reference frames, e.g. block 428 of reference frame 426. A motion vector 430 is used to determine the location of the block in the reference frame. Although FIG. 4C depicts a situation in which one reference frame is used for predicting the current block, it is known that multiple blocks in multiple reference frames may be used to determine a prediction for the current block.

A residual block 406 may be determined as a difference between the original samples of the original block 402 and the predicted samples of the predicted block 404. A quantization and transformation step may be applied to the residual samples in order to determine samples of a LR quantized and transformed residual block 408, followed by a reverse quantization and transformation step to determine samples of a reconstructed residual block 410. In an embodiment, an inloop filtering step may be applied to the LR reconstructed residual block in order to remove or at least reduce artefacts that may arise from the block-based transform step. Samples of a reconstructed block 414 may then be determined based on the samples of the reconstructed residual block and the predicted block. Applying this scheme to all blocks of the LR original frame results in a LR reconstructed frame that may be used as a reference frame for predicting the one or more second LR original frames as described with reference to FIG. 3.

Figure 5:
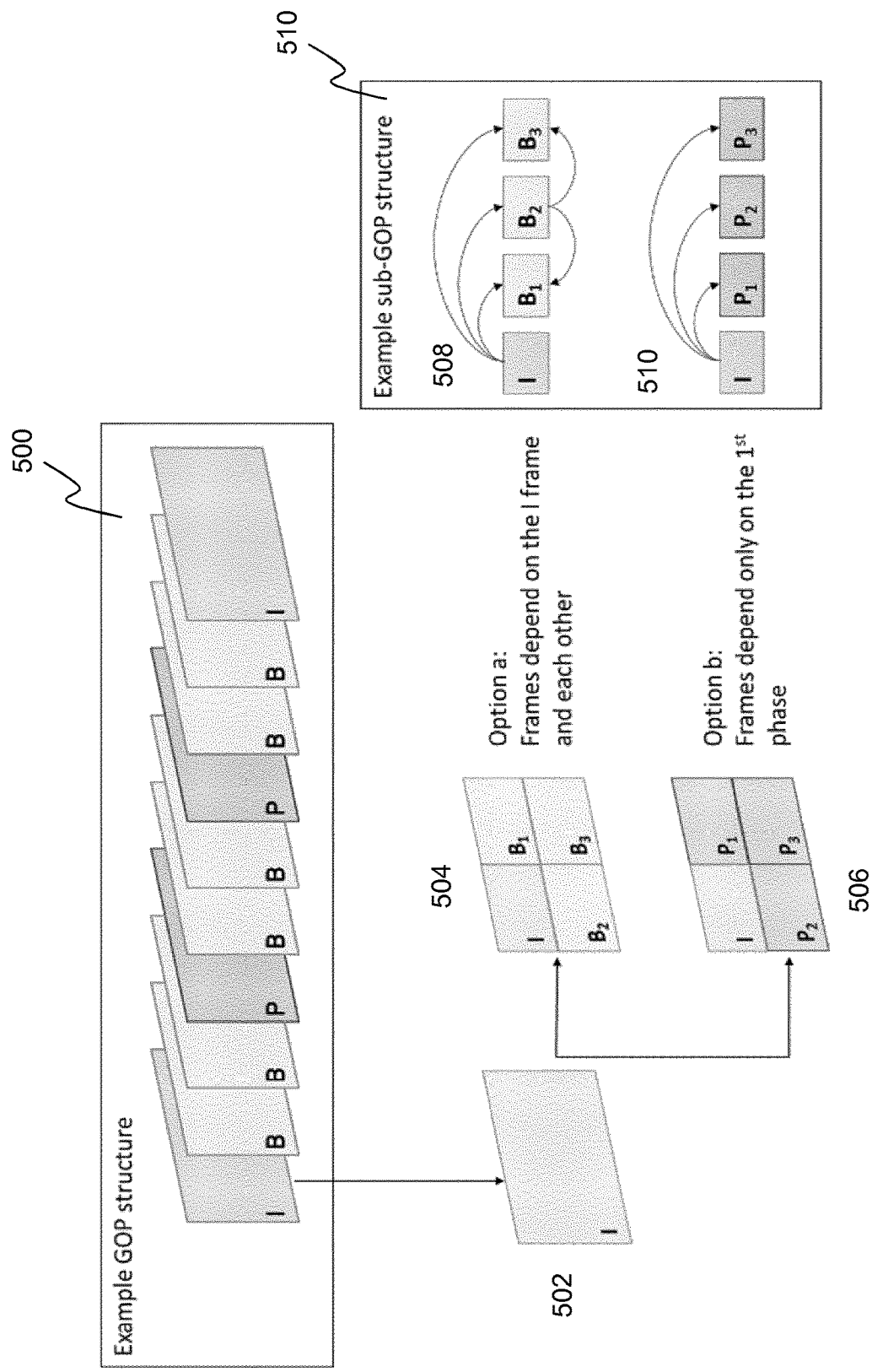
FIG. 5 schematically depicts a GOP structure including a sub-GOP structure according to an embodiment of the invention.

FIG. 5 schematically depicts a GOP structure including a sub-GOP structure according to an embodiment of the invention. As shown in this figure, a conventional GOP structure 500 may include I frames which are used as reference frames for a predetermined number of B and P frames. One or more of the I,P and/or B frames may be encoded based on a super resolution prediction mode as described in this application. In the example presented in FIG. 5, an I frame is encoded based on the super resolution prediction mode, which may result in a low-resolution reference frame and a plurality of low-resolution frames which are constructed on the basis of the low resolution reference frame. As described with reference to FIGS. 3 and 4, a low resolution reference frame may be determined based downsampling the original (current) frame into a plurality of LR original frames, determining a LR prediction frame based on an prediction method (in this case an intra-prediction method) and determining a LR reconstructed frame based on the LR prediction frame and the LR original frame, wherein the LR reconstructed frame is used as a reference frame for determining predictions for one or more second LR original frames on the basis of a block-matching prediction method. These predictions may form one or more second LR prediction frames.

Hence, the low-resolution reconstructed frame may define an low-resolution I frame of the sub-GOP, and the one or more second low-resolution prediction frames, which are predicted based on the low-resolution I frame, may define low-resolution P and/or B frames of the sub-GOP. In case of polyphase downsampling scheme, the sub-GOP comprises three low-resolution frames that are derived on the basis of the low-resolution I frame of the sub-GOP. As shown in FIG. 5, depending on the block-matching prediction method different sub-GOP structures may be constructed. In an embodiment, a sub-GOP 504 may comprise one low-resolution I frame and a plurality of low-resolution B frames, wherein each B frame may depend on the low-resolution I frame and (at least) one of other low-resolution B frames (as shown by arrows 508 of inset 510). In another embodiment, a sub-GOP 506 may include one low-resolution I frame and plurality of low-resolution P frames, wherein each low-resolution P frame only depends on the low-resolution I frame (as shown by feature 510 of the figure). It is submitted that the sub-GOP structures in FIG. 5 are non-limiting examples of many different sub-GOP structures that may exist without departing from the invention including sub-GOP structures that include one or more low resolution I frames and one or more P and/or B frames.

Figure 6:
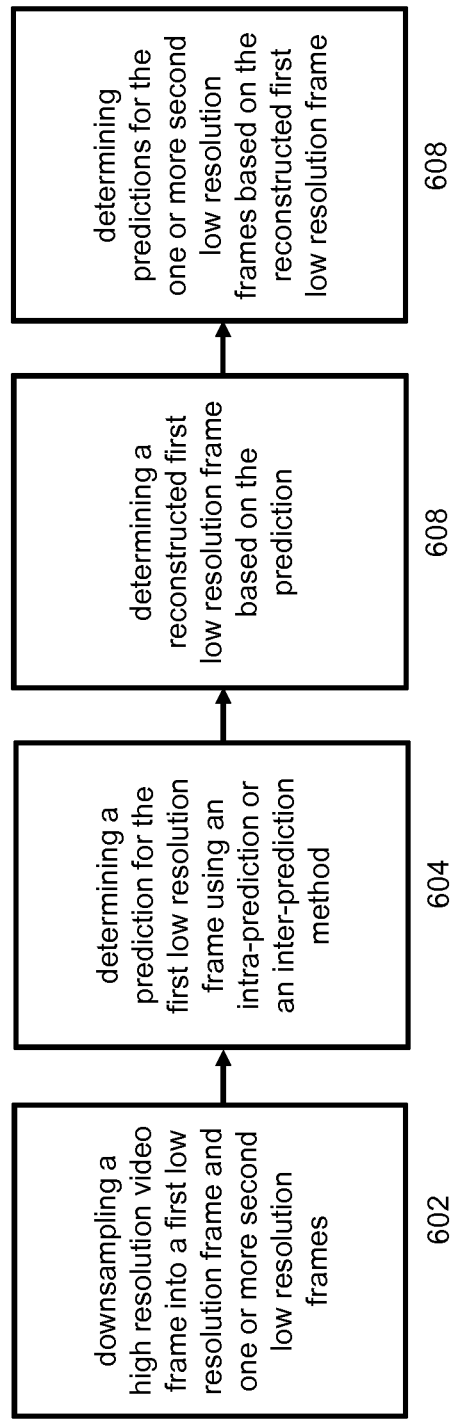
FIG. 6 depicts part of an encoding process for encoding video frames based on spatial sampling scheme according to an embodiment of the invention.

FIG. 6 depicts part of an encoding process for encoding video frames based on spatial sampling scheme (including spatial downsampling and spatial upsampling based on a plurality of spatial sampling lattices) according to an embodiment of the invention. This process may include an encoder apparatus downsampling a high-resolution video frame into a first low resolution (LR) frame and one or more second LR frames wherein the resolution of the first and second LR frames (step 602). In this step, any spatial downsampling filter may be used, e.g. spatial downsampling schemes as described with reference to FIGS. 1 and 2, as long as the downsampling operation that is used by the encoder apparatus is known to decoder apparatus (explicitly signalled or derived) so that reconstruction of the one or more original (high resolution) video blocks on the basis of the low-resolution video blocks can be achieved. In an embodiment, a spatial downsampling filter may be configured to perform polyphase downsampling. In such case, four low resolution frames may be produced by applying the well-known polyphase decomposition operation. This embodiment provides the advantage that the four low resolution video blocks that are created from the high-resolution video block contain the whole source information. In other words, polyphase downsampling does not cause any data loss.

Thereafter the first LR frame may be used for determining an accurate prediction. To that end, a first (initial) prediction for the first LR frame may be determined based on intra-prediction or inter-prediction (step 604) as described in detail with reference to FIGS. 3 and 4. Thereafter, the first (initial) prediction may be improved by determining a first LR reconstructed frame based on the initial prediction. The first LR reconstructed frame may be subsequently used as a reference for determining predictions for the one or more second LR video frames (step 606). The prediction process depicted in FIG. 6 is especially suitable for video frames having a large amount of pixels values with little correlation so that conventional prediction methods will not result in a sufficiently high coding efficiency.

The encoding processes described with reference to FIG. 3-6 may be implemented using a block-based video coding scheme. Hence, after downsampling the high-resolution video frame, the first LR original frame may be partitioned in blocks, e.g. coding tree blocks known from HEVC or similar blocks knowns from other coding standards. During this process, an algorithm is used to find the best block partitioning of the frame. Since the one or more second LR original frames are derived from the same high-resolution original frame, it is expected that the block partitioning of these frames is the same as the block partitioning for the first LR original frame. Thus, in the metadata that is transmitted in the bitstream to a decoder apparatus, the block partitioning may be signaled for the first LR original frame and reused for the other LR frames in the sub-GOP. This will yield significant bit saving and encoding time compared to determining and then signaling this metadata for each of the LR frames of the sub-GOP. Due to the close relation between the LR frames in the sub-GOP structure other types of metadata may also be used for the LR frames in the sub-GOP. For example, quantization information related to the quantization step of residual samples of residual blocks or information regarding the prediction method that is used for determining the first LR reconstructed frame and the prediction method that is used for determining predictions for the one or more second LR frames.

The encoding methods as illustrated in FIG. 3-6 may be used for efficiently encoding and decoding video frames. Hereunder, examples of such encoding and decoding processes and apparatuses for executing such processes are described in more detail.

Figure 7:
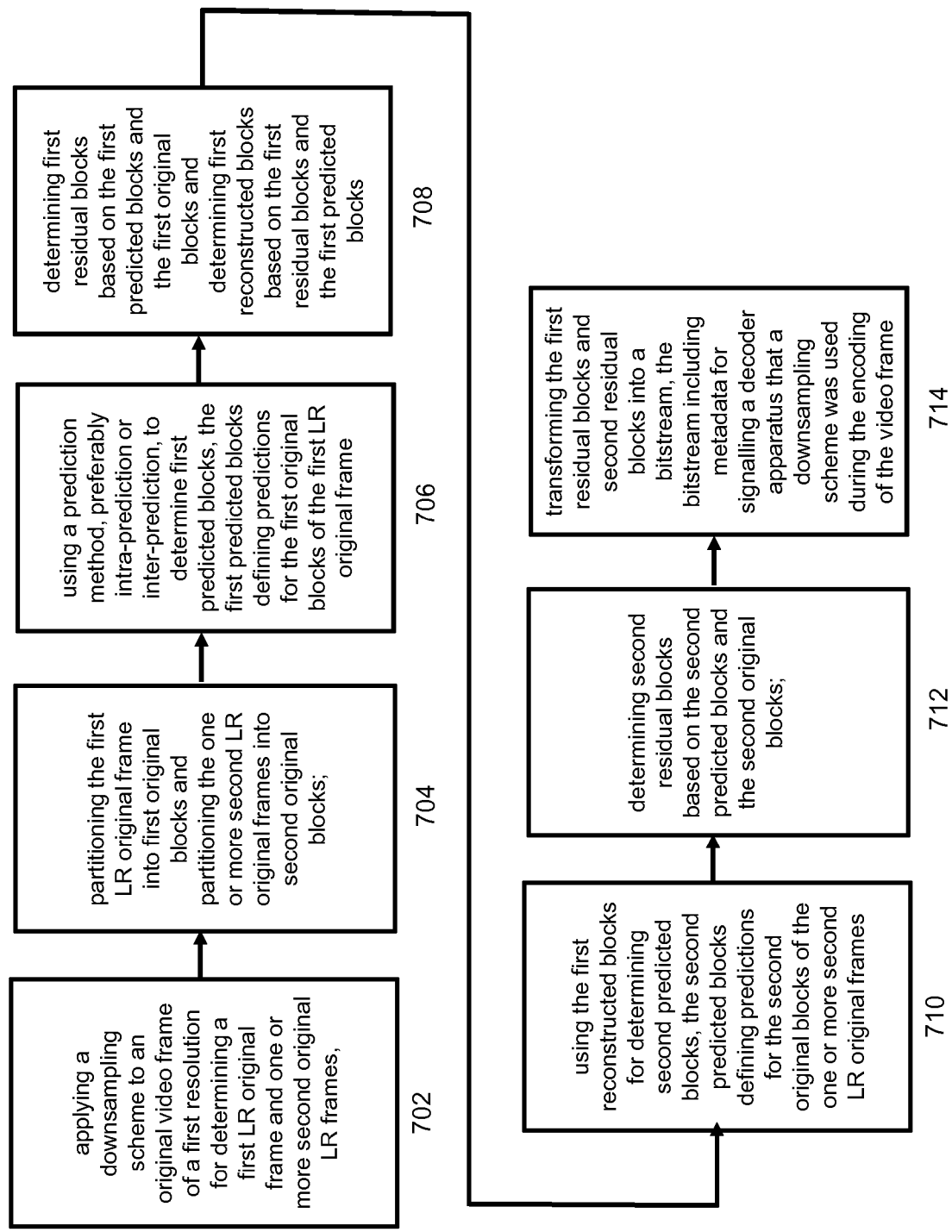
FIG. 7 depicts a block-based encoding process according to an embodiment of the invention.

FIG. 7 depicts a block-based encoding process according to an embodiment of the invention. The process may include a step of applying a downsampling scheme to an original video frame of a first resolution for determining a first LR original frame and one or more second LR original frames (step 702). The downsampling scheme may comprise a plurality of spatial downsampling lattices as described with reference to FIGS. 1 and 2. The first LR original frame may be partitioned into first original blocks based on a block-partitioning algorithm. Further, (each of) the one or more second LR original frames may be partitioned into second original blocks (step 704). A prediction method, preferably intra-prediction or inter-prediction, may be used to determine first predicted blocks for predicting the first original blocks of the first LR original frame (step 706). Then, first residual blocks are determined based on the first predicted blocks and the first original blocks. Then, first reconstructed blocks may be determined based on the first residual blocks and the first predicted blocks (step 708). The first reconstructed blocks may be used as a reference for determining second predicted blocks, wherein the second predicted blocks define predictions for the second original blocks of the one or more second LR original frames (step 710). Second residual blocks may be determined based on the second predicted blocks and the second original blocks (step 712). The first residual blocks and second residual blocks may be transformed into a bitstream and metadata may be inserted in the bitstream for signalling a decoder apparatus that a downsampling scheme was used during the encoding of the video frame (step 714).

Figure 8:
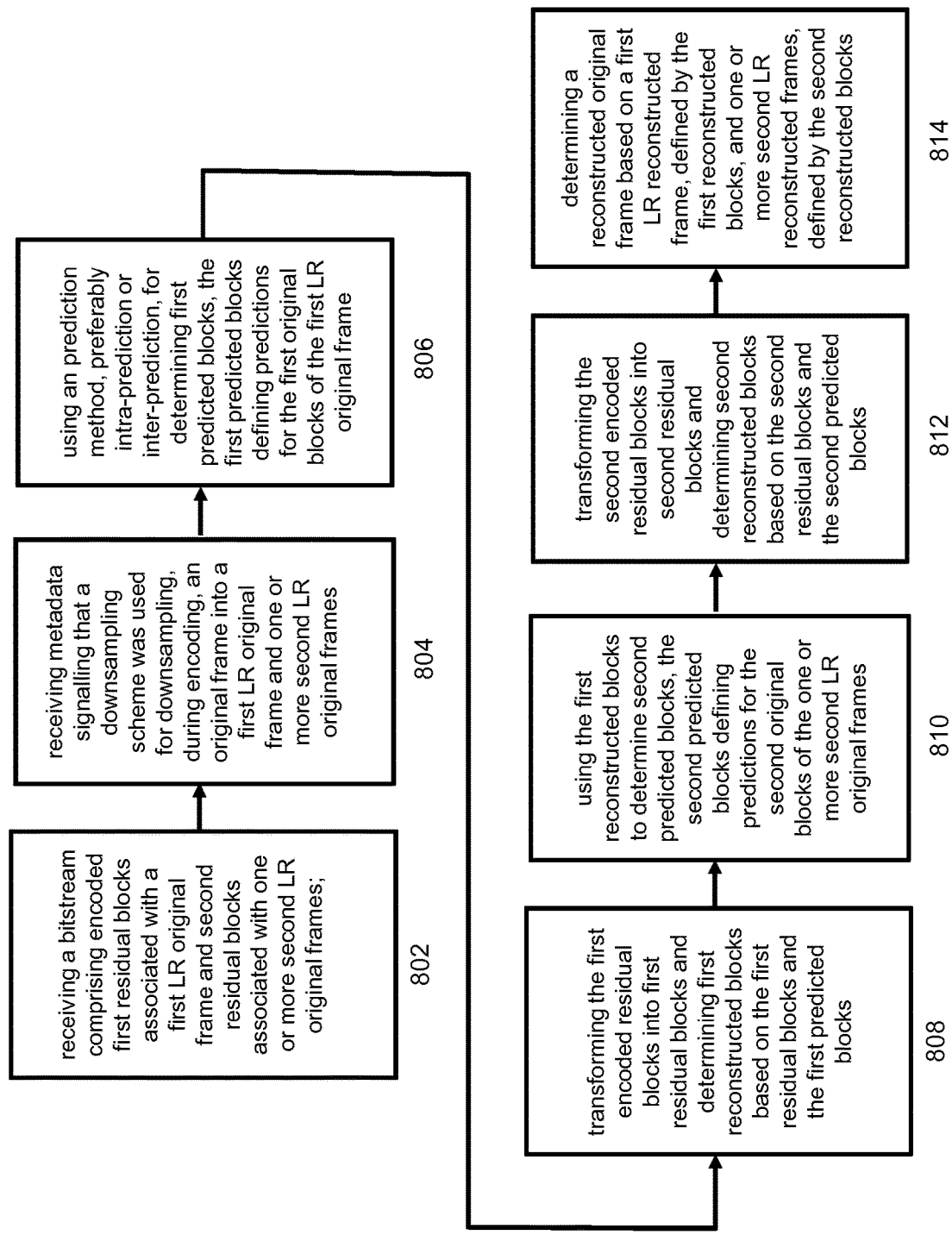
FIG. 8 depicts a block-based decoding process according to an embodiment of the invention.

FIG. 8 depicts a block-based decoding process according to an embodiment of the invention. The process may include a step of receiving (part of) a bitstream comprising encoded first residual blocks associated with a first LR original frame and second residual blocks associated with one or more second LR original frames (step 802). The encoded first and second residual blocks may be part of a sub-GOP structure as described in the various embodiments of this application. Further, metadata may be received for signaling the decoder apparatus that a downsampling scheme was used for downsampling—during encoding—an original frame into a first LR original frame and one or more second LR frames (step 804). Hence, in that case, the decoder is informed that for reconstructing the original video frame it needs to use an upsampling scheme to upsample the low-resolution frames and to combine the upsampled low-resolution frames into the reconstructed frame of the original video frame.

An intra-prediction method may be used for determining first predicted blocks, wherein the first predicted blocks define predictions for the first original blocks of the first LR original frame (step 806). Thereafter, the encoded first residual blocks are transformed into first residual blocks and first reconstructed blocks are determined based on the first residual blocks and the first predicted blocks (step 808).

Then, the first reconstructed blocks are used to determine second predicted blocks, wherein the second predicted blocks define predictions for the second original blocks of the one or more second LR original frames (step 810). The encoded second residual blocks are transformed into second residual blocks and second reconstructed blocks are determined based on the second residual blocks and the second predicted blocks (step 812). Finally, a reconstructed original video frame is determined based on a first LR reconstructed frame, defined by the first reconstructed blocks, and one or more second LR reconstructed frames defined by the second reconstructed blocks (step 814). In this step, the reconstructed original video frame may be determined by using an upsampling scheme wherein the first LR reconstructed frame and the one or more second LR reconstructed frames are upsampled and combined into the reconstructed original video frame of the first resolution.

Figure 9:
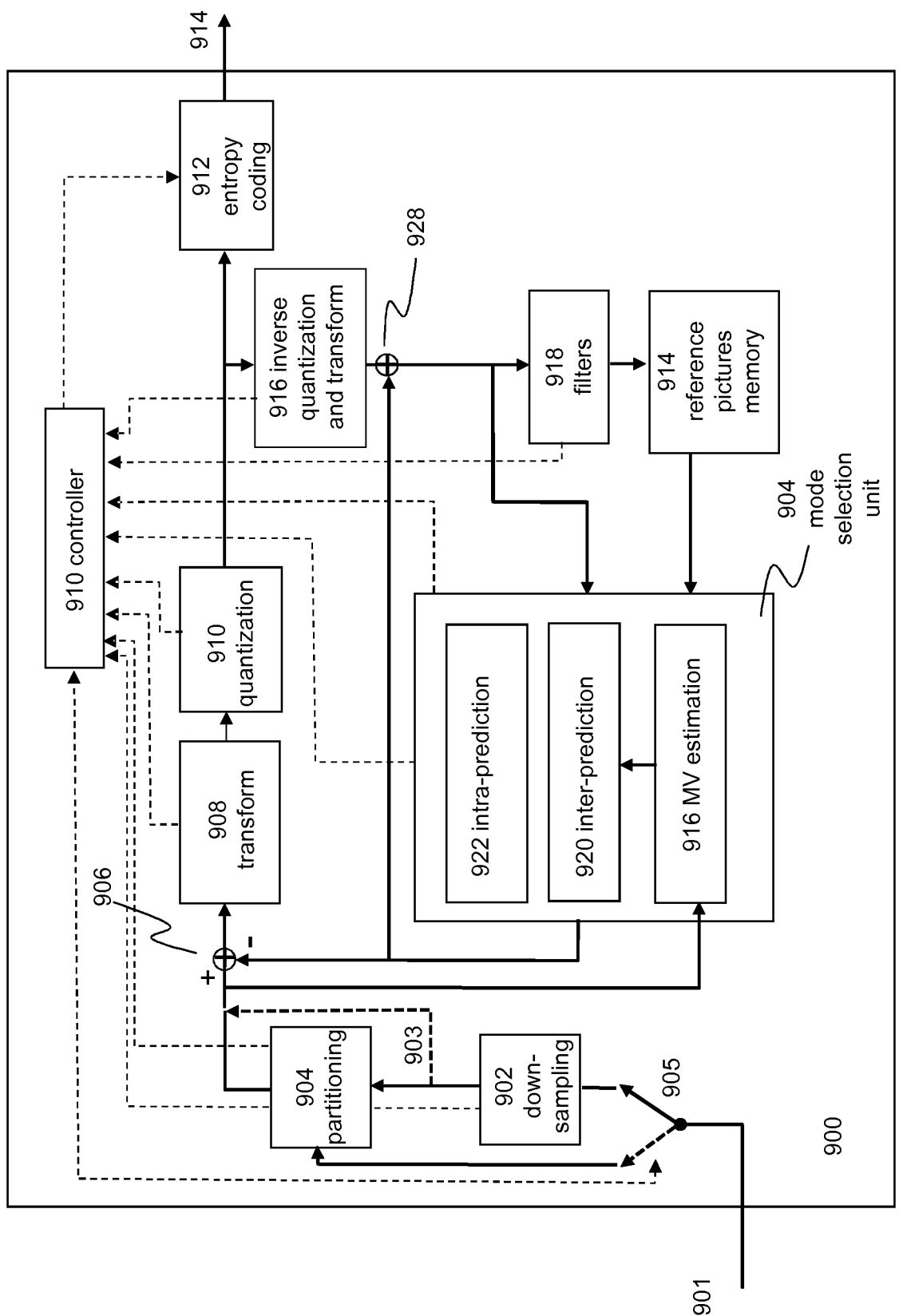
FIG. 9 depicts a block diagram illustrating an encoder apparatus according to an embodiment of the invention.

FIG. 9 depicts a block diagram illustrating an encoder apparatus according to an embodiment of the invention. The encoder apparatus 900 may perform intra-prediction and inter-prediction of blocks within video frames or parts thereof, e.g. video slices. Intra-prediction relies on spatial prediction to reduce or remove spatial redundancy in video within a given picture or video frame. In this application, inter-prediction relies on prediction to reduce or remove redundancy in video within adjacent pictures or pictures of a video sequence. It includes conventional block-based inter-prediction methods that rely on block prediction within a GOP. Additionally, it also includes block-matching prediction methods that can be used for predicting blocks of LR frames in a sub-GOP as described in the embodiments of this application. Intra-mode (I mode) may refer to any of several compression modes based on intra-prediction. Inter-modes, such as uni-directional prediction (P mode) or bi-prediction (B mode), may refer to any of several compression modes based on inter-prediction.

The video encoder may include an input 901 for receiving video data in the form of a sequence of video frames that need to be encoded. In the example of FIG. 9, the encoder apparatus may include a downsampling unit 902, a partitioning unit 904, a mode select unit 904, a summer 906, a transform unit 908, a quantization unit 910, an entropy encoding unit 912, and reference picture memory 914. Mode select unit 904, in turn, may comprise a motion estimation unit 916, an inter-prediction unit 920 and an intra-prediction unit 922. For video block reconstruction, the encoder apparatus may also include an inverse quantization unit 924, an inverse transform unit 926, and summer 928. A filter, such as a deblocking filter 918 may also be included to filter-out artefacts from the reconstructed video frames. Additional loop filters (in loop or post loop) may also be used in addition to the deblocking filter.

As shown in FIG. 9, the encoder may comprise a controller 910 that controls the encoding process and collects the associated metadata that needs to be encoded into the bitstream generated by the encoder apparatus. A selector 905 controlled by the controller may determine whether or not the downsampling unit 902 is used. If it is not used, video data at the input of the encoder apparatus will be sent to the partitioning unit for partitioning the video frame in blocks.

The mode select unit may be configured to select one of the coding modes such intra-prediction or inter-prediction, e.g., based on error results, and provides the resulting intra- or inter-coded block to summer 906 to generate a block of residual video data and to summer 928 to reconstruct the encoded block for use as a reference picture. During the encoding process, the encoder apparatus may receive a picture or slice to be coded. The picture or slice may be divided into multiple video blocks. The inter-prediction unit in the mode selection unit may perform inter-predictive coding of the received video block relative to one or more blocks in one or more reference pictures to provide temporal compression. Further, the intra-prediction unit in the mode selection unit may perform intra-predictive coding of the received video block relative to one or more neighbouring blocks in the same picture or slice as the block to be coded to provide spatial compression. The encoder apparatus may perform multiple coding passes, e.g. in a rate distortion optimization (RDO) scheme, to select an appropriate coding mode for each block of video data.

The partitioning unit may partition blocks of video data into sub-blocks, based on evaluation of previous partitioning schemes in previous coding passes. For example, the partition unit may initially partition a picture or slice into LCUs, and partition each of the LCUs into sub-CUs based on rate-distortion analysis (e.g., rate-distortion optimization). The partitioning unit may further produce a quadtree data structure indicative of partitioning of an LCU into sub-CUs. Leaf-node CUs of the quadtree may include one or more PUs and one or more TUs.

The motion vector (MV) estimation unit 916 may execute a process of calculating motion vectors for video blocks. A motion vector, for example, may indicate the displacement of a predictive block (a prediction unit or PU) of a video block within a current picture relative to a predictive block within a reference picture (or other coded unit) relative to the current block being coded within the current picture (or other coded unit). The motion vector estimation unit may determine a motion vector for a PU of a video block in an inter-coded slice by comparing the position of the PU to the position of a predictive block of a reference picture approximating the pixel values of the video block. Accordingly, in general, data for a motion vector may include a reference picture list, an index into the reference picture list (ref_idx), a horizontal component, and a vertical component. The reference picture may be selected from a first reference picture list (List 0) and a second reference picture list (List 1), each of which identify one or more reference pictures stored in reference picture memory 914.

The MV motion estimation unit may generate and send a motion vector that identifies the predictive block of the reference picture to entropy encoding unit 912 and the inter-prediction unit 920. That is, the motion estimation unit may generate and send motion vector data that identifies the reference picture list containing the predictive block, an index into the reference picture list identifying the picture of the predictive block, and a horizontal and vertical component to locate the predictive block within the identified picture.

In some examples, rather than sending the actual motion vector for a current PU, a motion vector prediction unit (not shown) may predict the motion vector to further reduce the amount of data needed to communicate the motion vector. In that case, rather than encoding and communicating the motion vector itself, motion vector prediction unit may generate a motion vector difference (MVD) relative to a known (or knowable) motion vector.

The motion vector prediction unit may build a motion vector predictor candidate list that includes several neighbouring blocks in spatial and/or temporal directions as candidates for MVP. When multiple motion vector predictor candidates are available (from multiple candidate blocks), motion vector prediction unit may determine a motion vector predictor for a current block according to predetermined selection criteria. For example, motion vector prediction unit may select the most accurate predictor from the candidate set based on analysis of encoding rate and distortion (e.g., using a rate-distortion optimization scheme or other coding efficiency analysis). In other examples, motion vector prediction unit 916 may generate an average of the motion vector predictor candidates. Other methods of selecting a motion vector predictor are also possible.

Upon selecting a motion vector predictor, motion vector prediction unit may determine a motion vector predictor index (mvp_flag), which may be used to inform a video decoder where to locate the MVP in a reference picture list containing MVP candidate blocks. Motion vector prediction unit 916 may also determine the MVD between the current block and the selected MVP. The MVP index and MVD may be used to reconstruct the motion vector.

Typically, the partition unit and mode selection unit, including the intra- and inter-prediction unit, the motion vector estimation unit may be highly integrated, but are illustrated separately for conceptual purposes.

Adder 906 of the encoder apparatus may be used to form a residual video block by subtracting a predicted video block (as identified by a motion vector) received from mode select unit 904 from the original video block being coded.

The transform processing unit 908 may be used to apply a transform, such as a discrete cosine transform (DCT) or a conceptually similar transform, to the residual video block in order to form a block of residual transform coefficient values. The transform processing unit may be used to perform other transforms which are conceptually similar to DCT. Wavelet transforms, integer transforms, sub-band transforms or other types of transforms could also be used. In any case, the transform processing unit may apply the transform to the residual block, producing a block of residual transform coefficients. The transform may convert the residual information from a pixel value domain to a transform domain, such as a frequency domain. The transform processing unit may send the resulting transform coefficients to the quantization unit, which quantizes the transform coefficients to further reduce bit rate. The quantization process may reduce the bit depth associated with some or all of the coefficients. The degree of quantization may be modified by adjusting a quantization parameter.

A controller 910 may provide syntax elements (metadata), such as motion vectors, intra-mode indicators, partitioning information, and other such syntax information, to entropy coding unit 912. The entropy coding unit may then encode the quantized transform coefficients and the syntax elements. For example, entropy coding unit may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighbouring blocks. Following the entropy coding by entropy coding unit, the encoded bitstream may be transmitted to another device (e.g., a video decoder) or stored for later transmission or retrieval.

Inverse quantization and inverse transform unit 916 apply inverse quantization and inverse transformation, respectively, to reconstruct the residual block in the pixel domain, e.g., for later use as a reference block. The inter-prediction unit may calculate a reference block by adding the residual block to a predictive block of one of the pictures of reference picture memory 914. The inter-prediction unit may also apply one or more interpolation filters to the reconstructed residual block to calculate sub-integer pixel values for use in motion estimation. The reconstructed residual block is added to the predicted block produced by the inter-prediction unit 920 to produce a reconstructed video block for storage in reference picture memory 914. The reconstructed video block may be used by the motion vector estimation unit and the inter-prediction unit as a reference block to inter-code a block in a subsequent picture.

When using the encoder apparatus in the super resolution mode, the controller of the encoder apparatus is configured to encode a video frame according to the process steps as described with reference to FIG. 7. Thus, in that case, the encoder apparatus is capable of encoding downsampled LR frames of an original video frame.

A video frame at the input of the encoder apparatus may be downsampled by the downsampling unit into a first LR original frame and one or more second LR original frames. The first LR original frame may forwarded to the partitioning unit for partitioning in blocks. The partitioning of the first LR original frame may be applied to the one or more second LR original frames so in some embodiments the one or more second LR frames are not processed by the partitioning unit (as schematically depicted by the dotted line 903). Then, depending whether the video frame is a I frame or a P or B frame, the first predicted blocks may be determined by an intra-prediction method of the intra-prediction unit or by an inter-prediction method of the inter-prediction unit, wherein the first predicted blocks form predictions for the first original blocks of the first original frame.

The first predicted blocks and the first original blocks may be used to determine first residual blocks, which may be processed by the transform and quantization units and the inverse quantization and transform unit in order to determine first reconstructed residual blocks. Then first reconstructed blocks may be determined by using summer 928 which adds the first reconstructed residual blocks to the first predicted blocks. The first reconstructed blocks defines a first LR reconstructed vide frame, which may be stored as a reference frame for determining predictions of the one or more second LR original frames.

As already described above with reference to FIG. 8, second predicted blocks for predicting second original blocks of the one or more second LR original frames may be determine using a suitable block-matching prediction method which may be implemented in the inter-prediction unit. The predictions for the second original blocks of the one or more second LR original frames may be determined using the first reconstructed blocks of a first LR reconstructed frame as a reference. The first and second predicted blocks and the first and second original blocks may be used to determine first and second residual blocks of a sub-GOP data structure, which are transformed and quantized before being transformed by an entropy coder into a bitstream. The controller collects the metadata associated with the sub-GOP data structure, wherein the metadata may include information about the downsampling scheme, the partitioning, the prediction type that was used for determining the first predicted blocks for predicting the first original blocks of the first LR original frame and the prediction type that was used for determining the second predicted blocks for predicting the second original blocks of the one or more second original LR frames. During the entropy coding process, the metadata is coded and inserted in the bitstream.

The encoder may perform a known rate-distortion optimisation (RDO) process in order to find the best coding parameters for coding blocks in a picture. Here, the best coding parameters (including mode decision; intra prediction mode; inter prediction mode or super resolution mode; and quantization) refer to the set of parameters that provide the best trade-off between a number of bits used for encoding a block versus the distortion that is introduced by using the number of bits for encoding. The term rate-distortion optimization is sometimes also referred to as RD optimization or simply "RDO". RDO schemes that are suitable for AVC and HEVC type coding standards are known as such, see for example, Sze, Vivienne, Madhukar Budagavi, and Gary J. Sullivan. "*High efficiency video coding (HEVC)*." Integrated Circuit and Systems, Algorithms and Architectures. Springer (2014); 1-375; Section: 9.2.7 RD Optimization. RDO can be implemented in many ways. In one well-known implementation, the RDO problem can be expressed as a minimization of a Lagrangian cost function J with respect to a Lagrangian multiplier $$\lambda :: \min_{(coding\ parameters)} J = (D + \lambda * R).$$

Here, the parameter R represents the rate (i.e. the number of bits required for coding) and the parameter D represents the distortion of the video signal that is associated with a certain rate R. The distortion D may be regarded a measure of the video quality. Known metrics for objectively determining the quality (objectively in the sense that the metric is content agnostic) include means-squared error (MSE), peak-signal-to-noise (PSNR) and sum of absolute differences (SAD).

In the context of HEVC, the rate-distortion cost may require that the video encoder computes a predicted video block using each of the available prediction modes, including the super resolution mode as described in this application. The encoder apparatus then determines a difference between each of the predicted blocks and the current block (i.e. the residual block of a residual video frame) and transforms each of the residual block from the spatial domain to the frequency domain. Next, the encoder apparatus may quantize each of the transformed residual blocks to generate corresponding encoded video blocks. The encoder apparatus may decode the encoded video blocks and compare each of the decoded video block to the current block to determine a distortion metric D. Moreover, this full rate-distortion analysis involves computing the rate R for each of the prediction modes, i.e. the number of bits used to signal each of the encoded video blocks. The thus determined RD costs are then used to select a block that provides the best trade-off between a number of bits used for encoding a block versus the distortion that is introduced by using the number of bits for encoding.

Figure 10:
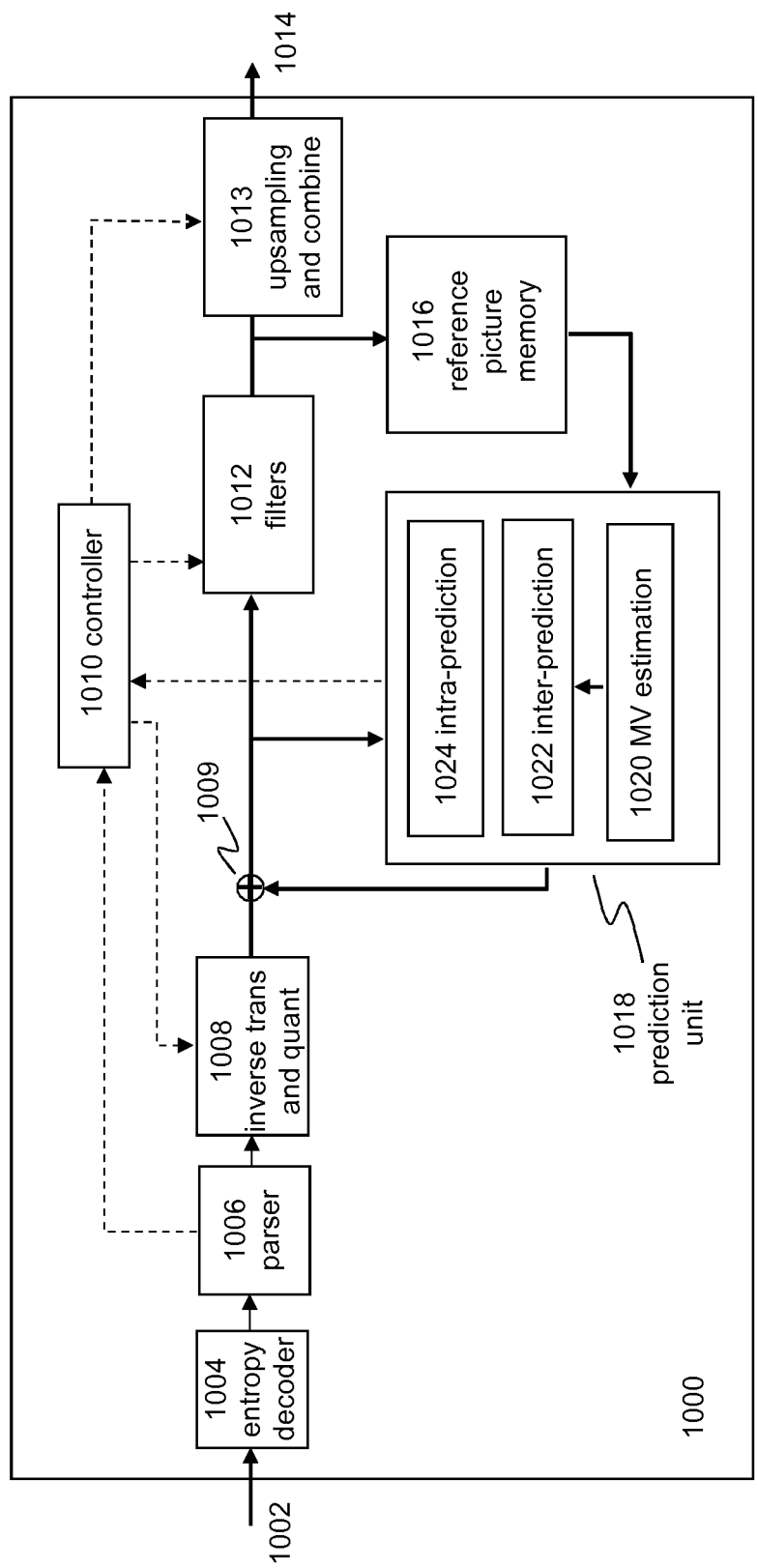
FIG. 10 depicts a block diagram illustrating a decoder apparatus according to an embodiment of the invention.

FIG. 10 depicts a block diagram illustrating a decoder apparatus according to an embodiment of the invention. In the example of FIG. 10, the decoder apparatus may include an entropy decoding unit 1004, a parser 1006, a prediction unit 1018, an inverse quantization and inverse transformation unit 1008, a summer 1009, and a reference picture memory 1016. The prediction unit may include a motion vector (MV) estimation unit 1020, an inter-prediction unit 1022 and an intra-prediction unit 1024.

During the decoding process, video decoder 1000 receives an encoded video bitstream 1002 that represents video blocks of an encoded video slice and associated syntax elements from an encoder apparatus. The entropy decoding unit may decode the bitstream to generate quantized coefficients, motion vectors, and other syntax elements. Parser unit 1006 forwards the motion vectors and other syntax elements (metadata) to prediction unit 1018.

The syntax elements may be received at video slice level and/or video block level. For example, by way of background, video decoder 1000 may receive compressed video data that has been compressed for transmission via a network into so-called network abstraction layer (NAL) units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI).

When the decoder is signalled that the blocks of a video frame are coded as intra-coded (I) blocks, the intra-prediction unit may generate prediction data, predicted blocks, for the originals block of the original (current) video frame based on a signalled intra-prediction mode and data from previously decoded blocks of the current picture, e.g. reference pixels from previously decoded bocks that are located close to the original block.

Similarly, when the decoder apparatus is signalled that the blocks of the video frame are coded based on a super-resolution mode, the decoder may determine a sub-GOP structure in the bitstream wherein the sub-GOP structure is associated with an original frame that is encoded on the basis of a spatial downsampling scheme. Based on the metadata, the decoder apparatus may determine that the downsampling scheme was used for downsampling—during encoding—an original frame into a first LR original frame and one or more second LR original frames. Further, in that case, the decoder apparatus knows that it needs to use an upsampling scheme for upsampling the LR reconstructed frames into a reconstructed original video frame.

Based on the metadata, the decoder apparatus may entropy decode the bitstream part representing a sub-GOP into first quantized coefficients of first residual blocks associated with a first LR original frame and second quantized coefficients of one or more second residual blocks associated with one or more second LR original frames. These quantized coefficients may be subsequently reverse transformed and reverse quantized into first residual blocks associated with the first LR original frame and second residual blocks associated with the one or more second LR original frames. Further, a prediction method may be used to determine first predicted blocks defining predictions for the first original blocks of the first LR original frame. Based on the first predicted blocks and the first residual blocks, first reconstructed blocks may be determined. The first reconstructed blocks may define a first LR reconstructed frame which may be used as a reference in block-matching prediction method executed by the inter-prediction unit for determining second predicted blocks that define predictions for the second original blocks of the one or more second LR original frames. The first and second predicted blocks and the first and second residual blocks may then be used to determine a first LR reconstructed frame and one or more second LR reconstructed frames which are subsequently used for determining a reconstructed original video frame. The generation of the reconstructed original video frame may be executed by the upsampling and combing unit 1013 of the decoder apparatus. The process may include upsampling the first LR reconstructed frame and the second LR reconstructed frames and combining the upsampled first and second LR reconstructed frames. Here, the upsampling process may reverse the downsampling process that was used during encoding.

When the picture is coded based on inter-prediction, inter-prediction unit 1022 of prediction unit produces predictive blocks for a video block of the current video slice based on the motion vectors and other syntax elements received from entropy decoding unit 1004. The predictive blocks may be produced from one of the reference pictures within one of the reference picture lists. The video decoder may construct the reference picture using well known construction techniques based on reference pictures stored in reference picture memory 1016.

Inter-prediction unit may determine prediction information for a video block of the current video slice by parsing the motion vectors and other syntax elements and uses the prediction information to produce the predictive blocks for the current video block being decoded. For example, inter-prediction unit may use some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice. In some examples, inter-prediction unit may receive certain motion information from motion vector prediction unit (not shown).

Motion vector prediction unit may use an MVP or index to identify the motion information used to predict the motion vector of a current block. Motion vector prediction unit may combine the identified MVP with a received MVD to determine the motion vector for the current block. After determining motion information for the current block, motion vector prediction unit may generate the predictive block for the current block.

Inverse quantization and inverse transform unit 1008 inverse quantizes, i.e., de-quantizes, the quantized transform coefficients provided in the bitstream and decoded by entropy decoding unit. The inverse quantization process may include use of a quantization parameter calculated by video encoder for each video block in the video slice to determine a degree of quantization and, likewise, a degree of inverse quantization that should be applied. It may further apply an inverse transform, e.g., an inverse DCT, an inverse integer transform, or a conceptually similar inverse transform process, to the transform coefficients in order to produce residual blocks in the pixel domain.

After inter-prediction unit 1022 generates the predictive block for the current video block based on the motion vectors and other syntax elements, the video decoder forms a decoded video block by summing the residual blocks determined by inverse transform process with the corresponding predictive blocks generated by inter-prediction unit 1020. The adder 1009 represents the component or components that perform this summation operation. If desired, a deblocking filter may also be applied to filter the decoded blocks in order to remove blocking artefacts. Other loop filters (either in the coding loop or after the coding loop) may also be used to smooth pixel transitions, or otherwise improve the video quality. The decoded video blocks in a given picture are then stored in reference picture memory 1016, which stores reference pictures used for subsequent motion prediction. Reference picture memory 1016 also stores decoded video for later presentation on a display device.

Hence, the encoder apparatus and decoder apparats of FIGS. 9 and 10 respectively, may support a super resolution prediction mode which may use a downsampling scheme for downsampling an original video frame in low resolution video frames and upsampling low resolution video frames into an original video frame.

A first parameter, e.g. a flag, may be used to signal the super resolution modes. A second parameter may only be present if a downsampling scheme is used. This second parameter may define the type of downsampling scheme used, for instance polyphase downsampling. It is noted that the syntax is merely an example and many other alternatives can be used, for instance only one flag, longer or shorter bit depth, etc. In addition, and/or alternatively, the signalling can also be inserted in a new SEI message.

Figure 11:
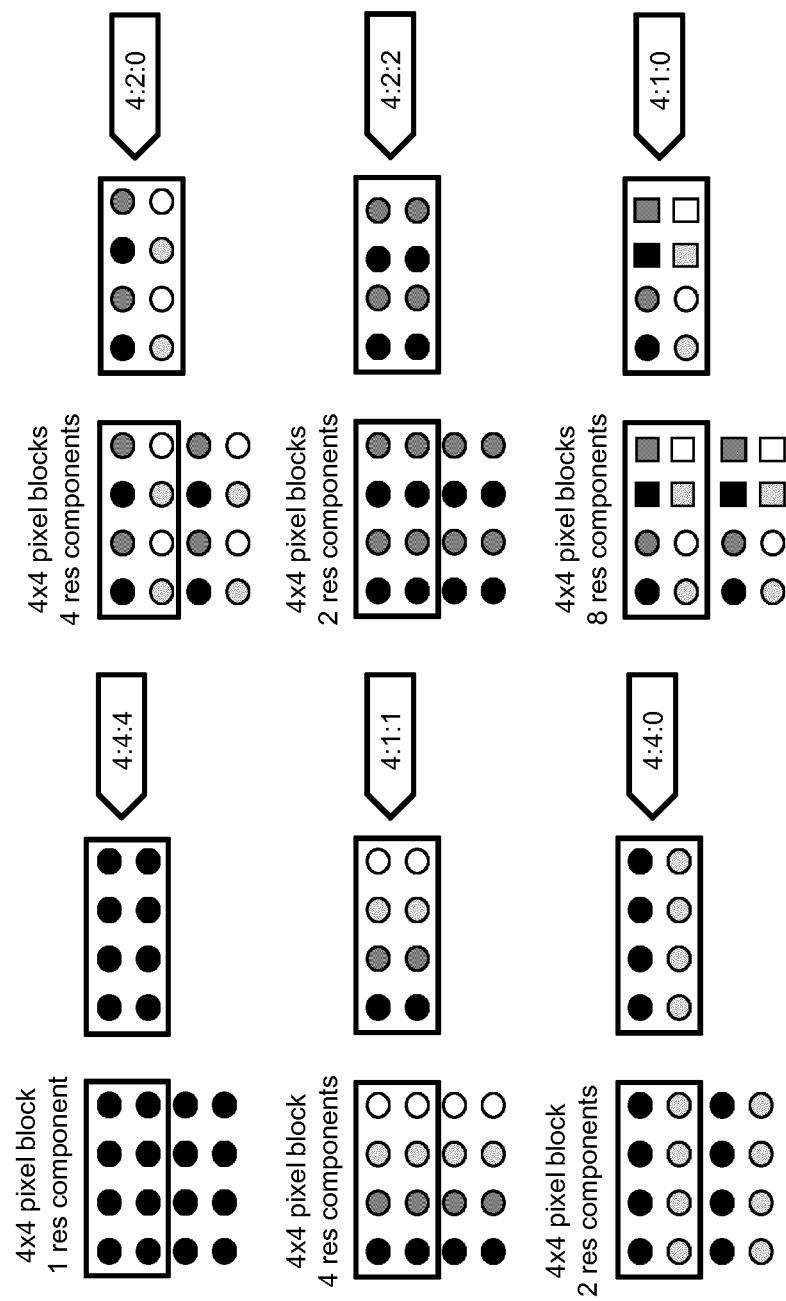
FIG. 11 depicts examples of resolution component formats that may be used in the embodiments described in this disclosure.

FIG. 11 depicts examples of resolution component types that may be used in the embodiments described in this disclosure. For example, the 4:2:0 format corresponds to a polyphase subsampling scheme where one sample of a resolution component may contribute up to 4 pixels of the high-resolution video block (1 to 4 depending on the applied downsampling operation, e.g. polyphase is 1). Similarly, the 4:4:4 format corresponds to a situation wherein the resolution components and the high-resolution video block have the same resolution. In this case there is no spatial subsampling. If the bitstream contains multiple resolution components with the 4:4:4 format, then this is similar to SNR scalability where the reconstructed output frame benefits from a better PSNR but not a higher resolution. Per resolution component format, a given number of resolution components are expected to convey the same full video signal as in the case where there is no spatial subsampling (4:4:4).

TABLE 4

Expected number of resolution components per format

| Resolution component format | Expected number of resolution components |
| --- | --- |
| 4:1:1 | 4 |
| 4:2:0 | 4 |
| 4:2:2 | 2 |
| 4:4:4 | 1 |
| 4:4:0 | 2 |

The table above gives the expected number of resolution components which may form a group of resolution components that can be used to reconstruct the original (high resolution) video signal. The video source that is represented by the bitstream is a sequence of pictures in decoding order, wherein the source and decoded pictures may each comprise one resolution component array wherein each resolution component array may comprise one or more colour sample arrays: Luma (Y) only (monochrome); Luma and two chroma (YCbCr or YCgCo); Green, Blue and Red (GBR, also known as RGB); or, arrays representing other unspecified monochrome or tri-stimulus colour samplings (for example, YZX, also known as XYZ).

In another embodiment, the spatial subsampling scheme is not or not completely predefined. In that case, the upscaling filter, the location of the pixels from the LR video frames and the algorithm to compute the pixels in the HR video frames need to be signalled to the decoder. In a generic way, this information may be signalled in the decoder information e.g. based on a vector per resolution component. In an embodiment, this information may be defined with sub-pixel accuracy, indicating the displacement of the resolution component with respect to an origin, e.g. the top left origin (0,0), in pixel units and an algorithm to compute every pixel value from the HR frame based on a recombination of the video frames of the low-resolution components. In this case, the recombination process may be a super-resolution image reconstruction technique as referred to in this disclosure.

Figure 12:
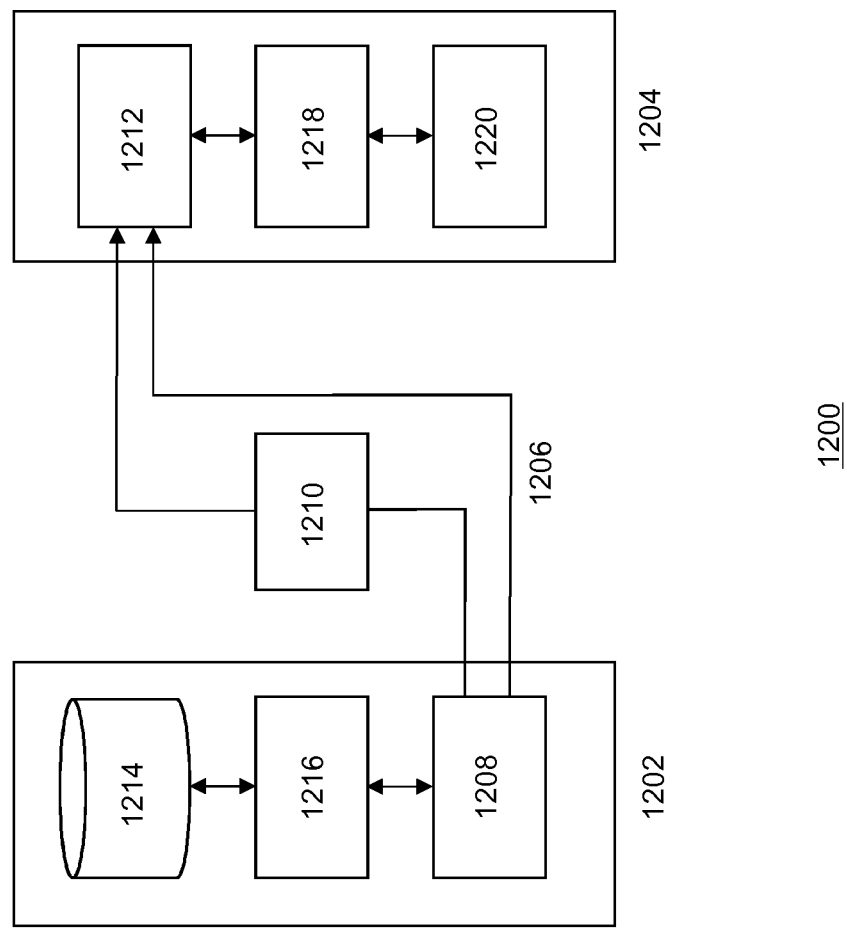
FIG. 12 depicts a schematic of a video encoding and decoding system that may use the embodiments described in this application.

FIG. 12 depicts a schematic of a video encoding and decoding system that may use the embodiments described in this application. As shown in FIG. 12, system 1200 may include a first video processing device 1202, e.g. a video capturing device or the like, configured to generate encoded video data which may be decoded by a second video processing device 1204, e.g. a video playout device. First and second video processing devices may include any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, The video processing devices may be equipped for wireless communication.

The second video processing device may receive the encoded video data to be decoded through a transmission channel 1206 or any type of medium or device capable of moving the encoded video data from the first video processing device to the second video processing device. In one example, the transmission channel may include a communication medium to enable the first video processing device to transmit encoded video data directly to the second video processing device in real-time. The encoded video data may be transmitted based on a communication standard, such as a wireless communication protocol, to the second video processing device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, servers or any other equipment that may be useful to facilitate communication between first and second video processing devices.

Alternatively, encoded data may be sent via an I/O interface 1208 of the first video processing device to a storage device 1210. Encoded data may be accessed by input an I/O interface 1212 of the second video processing device. Storage device 1210 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may hold the encoded video generated by the first video processing device. The second video processing device may access stored video data from storage device via streaming or downloading. The file server may be any type of server capable of storing encoded video data and transmitting that encoded video data to the second video processing device. Example file servers include a web server (e.g., for a website), an FTP server, network attached storage (NAS) devices, or a local disk drive. The second video processing device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 36 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 1200 may be configured to support one-way or two-way video transmission to support applications such as video streaming, video playback, video broadcasting, and/or video telephony.

In the example of FIG. 12, the first video processing device may further include a video source 1214 and a video encoder 1216. In some cases, I/O interface 1208 may include a modulator/demodulator (modem) and/or a transmitter. The video source may include any type of source such as a video capture device, e.g., a video camera, a video archive containing previously captured video, a video feed interface to receive video from a video content provider, and/or a computer graphics system for generating computer graphics data as the source video, or a combination of such sources. If video source 1214 is a video camera, the first and second video processing device may form so-called camera phones or video phones. However, the techniques described in this disclosure may be applicable to video coding in general, and may be applied to wireless and/or wired applications.

The captured, pre-captured, or computer-generated video may be encoded by video encoder 1216. The encoded video data may be transmitted directly to the second video processing device via I/O interface 1208. The encoded video data may also (or alternatively) be stored onto storage device 1210 for later access by the second video processing device or other devices, for decoding and/or playback.

The second video processing device may further comprise a video decoder 1218, and a display device 1220. In some cases, I/O interface 1212 may include a receiver and/or a modem. I/O interface 1212 of the second video processing device may receive the encoded video data. The encoded video data communicated over the communication channel, or provided on storage device 1210, may include a variety of syntax elements generated by video encoder 1216 for use by a video decoder, such as video decoder 1218, in decoding the video data. Such syntax elements may be included with the encoded video data transmitted on a communication medium, stored on a storage medium, or stored a file server.

Display device 1220 may be integrated with, or external to, the second video processing device. In some examples, second video processing device may include an integrated display device and also be configured to interface with an external display device. In other examples, second video processing device may be a display device. In general, display device displays the decoded video data to a user, and may comprise any of a variety of display devices such as a liquid crystal display (LCD), a plasma display, an organic light emitting diode (OLED) display, or another type of display device.

Video encoder 1216 and video decoder 1218 may operate according to a video compression standard, such as the High Efficiency Video Coding (HEVC), VP9 or AV1. Alternatively, video encoder 1216 and video decoder 1218 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard.

Although not shown in FIG. 12, in some aspects, video encoder 1216 and video decoder 1218 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 1216 and video decoder 1218 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 1216 and video decoder 1218 may be included in one or more encoders or decoders, either of which may be integrated as part of a combined encoder/decoder (CODEC) in a respective device.

This disclosure may generally refer to video encoder "signalling" certain information to another device, such as video decoder. The term "signalling" may generally refer to the communication of syntax elements and/or other data (metadata) used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of encoding a video frame into a bitstream, the method comprising:
a processor of an encoding apparatus making a frame-level decision in-loop to apply a frame-level super resolution prediction mode of encoding to an original video frame of a first resolution, wherein the decision is made at the frame-level of one or more video frames, and wherein the frame-level super resolution prediction mode is carried out in-loop and comprises:
based on the decision, the processor applying a downsampling scheme to the original video frame for determining a first low-resolution (LR) original frame and one or more second original LR frames, the first LR original frame and the one or more second LR original frames being of a second resolution that is lower than the first resolution;
based on the decision, the processor partitioning the first LR original frame into first original blocks and partitioning the one or more second LR frames into second original blocks;
based on the decision, the processor using a prediction method for determining first predicted blocks, the first predicted blocks defining predictions for the first original blocks of the first LR original frame;
based on the decision, the processor determining first residual blocks based on the first predicted blocks and the first original blocks and, subsequently, determining first reconstructed blocks based on the first residual blocks and the first predicted blocks;
based on the decision, the processor determining second predicted blocks based on the first reconstructed blocks, the second predicted blocks defining predictions for the second original blocks of the one or more second LR original frames;
based on the decision, the processor determining second residual blocks based on the second predicted blocks and the second original blocks; and
based on the decision, the processor transforming the first residual blocks and second residual blocks into the bitstream, the bitstream including metadata for signalling a decoder apparatus that during the encoding a downsampling scheme was used for downsampling the video frame.

2. The method according to claim 1, wherein the video frame is an I frame, a P frame, or a B frame, and wherein determining the first predicted blocks comprises:
using an intra-prediction method for determining the first predicted blocks when the video frame is an I frame; and
using an inter-prediction method for determining the first predicted blocks when the video frame is P frame or a B frame.

3. The method according to claim 1, wherein the first reconstructed blocks define a first LR reconstructed frame, the first LR reconstructed frame defining a reference frame for determining the second predicted blocks.

4. The method according to claim 3 wherein a block-matching prediction method is used for determining the second predicted blocks, the block-matching prediction method being based on an intra region-based template matching method or an intra copy block method.

5. The method according to claim 1, wherein the first residual blocks associated with the first LR original frame and second residual blocks associated with the one or more second LR original frames define a data structure, the data structure being associated with metadata for a sub Group of Pictures (sub-GOP).

6. The method according to claim 1, wherein the downsampling scheme is a polyphase downsampling scheme, the downsampling scheme including a plurality of spatial downsampling lattices.

7. The method according to claim 1, wherein the first LR original frame and the one or more second LR original frames are spatially multiplexed into a multiplexed video frame of the first resolution.

8. The method according to claim 1, wherein the metadata includes a type of metadata, the type of metadata being at least one of: (i) one or more first parameters for signalling the decoder apparatus the type of downsampling scheme that was used by the encoder apparatus; (ii) one or more second parameters for signalling the decoder apparatus the type of prediction that was used for predicting the first predicted blocks; or (iii) one or more third parameters for signalling the decoder apparatus the type of prediction that was used for predicting the second predicted blocks.

9. A method of decoding a bitstream into a video frame, the method comprising:
 a processor of a decoding apparatus receiving the bitstream, the bitstream comprising first encoded residual blocks associated with a first low-resolution (LR) original frame and second encoded residual blocks associated with one or more second LR original frames;
 the processor receiving metadata associated with the first and second encoded residual blocks, the metadata signalling the decoder apparatus that an encoder apparatus used a downsampling scheme of a frame-level super resolution prediction mode, carried out in-loop, for downsampling an original frame of a first resolution into the first LR original frame and the one or more second LR original frames, the first LR original frame and the one or more second LR original frames being of a second resolution that is lower than the first resolution;
 based on the signalling, the processor applying a frame-level super resolution prediction mode of decoding to the bitstream, wherein the frame-level super resolution prediction mode is carried out in-loop and comprises:
 based on the signalling, the processor using a prediction method for determining first predicted blocks, the first predicted blocks defining predictions for the first original blocks of the first LR original frame;
 based on the signalling, the processor transforming the first encoded residual blocks into first residual blocks and determining first reconstructed blocks based on the first residual blocks and the first predicted blocks, the first reconstructed blocks defining a first LR reconstructed frame;
 based on the signalling, the processor determining second predicted blocks based the first reconstructed blocks, the second predicted blocks defining predictions for the second original blocks of the one or more second LR original frames;
 based on the signalling, the processor transforming the second encoded residual blocks into second residual blocks and determining second reconstructed blocks based on the second residual blocks and the second predicted blocks, the second reconstructed blocks defining one or more second LR reconstructed frames; and
 based on the signalling, the processor determining a reconstructed original video frame based on the first LR reconstructed frame and the one or more second LR reconstructed frames.

10. The method according to claim 9, wherein determining the reconstructed blocks comprises:
 upsampling the first LR reconstructed frame and the one or more second LR reconstructed frames based on an upsampling scheme that is associated with the downsampling scheme; and
 combining the upsampled first LR reconstructed frame and the upsampled second LR reconstructed frame into the reconstructed original video frame.

11. The method according to claim 9, wherein a block-matching prediction method is used for determining the second predicted blocks, the block-matching prediction method being based on an intra region-based template matching method or a intra copy block method.

12. The method according to claim 1, wherein the bitstream is at least one of a High Efficiency Video Coding (HVEC) based bitstream, an Alliance for Open Media Video (AVI) based bitstream, or a Versatile Video Coding (VVC) based bitstream.

13. An apparatus for encoding a video frame into a bitstream, the apparatus comprising:
 a processor and memory storing computer-readable instructions that, when executed by the processor, cause the apparatus to carry out operations including:
 making a frame-level decision in-loop to apply a frame-level super resolution prediction mode of encoding to an original video frame of a first resolution, wherein the decision is made at the frame-level of one or more video frames, and wherein the frame-level super resolution prediction mode is carried out in-loop;
 based on the decision, applying a downsampling scheme to the original video frame for determining a first low-resolution (LR) original frame and one or more second original LR frames, the first LR original frame and the one or more second LR original frames being of a second resolution that is lower than the first resolution;
 based on the decision, partitioning the first LR original frame into first original blocks and partitioning the one or more second LR frames into second original blocks;
 based on the decision, using a prediction method for determining first predicted blocks, the first predicted blocks defining predictions for the first original blocks of the first LR original frame;
 based on the decision, determining first residual blocks based on the first predicted blocks and the first original blocks and, subsequently, determining first reconstructed blocks based on the first residual blocks and the first predicted blocks;
 based on the decision, determining second predicted blocks based on the first reconstructed blocks, the second predicted blocks defining predictions for the second original blocks of the one or more second LR original frames;
 based on the decision, determining second residual blocks based on the second predicted blocks and the second original blocks; and
 based on the decision, transforming the first residual blocks and second residual blocks into the bitstream, the bitstream including metadata for signalling a decoder apparatus that during the encoding a downsampling scheme was used for downsampling the video frame.

14. An apparatus for decoding a bitstream into a video frame, the apparatus comprising:
 a processor and memory storing computer-readable instructions that, when executed by the processor, cause the apparatus to carry out operations including:
 receiving the, the bitstream comprising first encoded residual blocks associated with a first low-resolution (LR) original frame and second encoded residual blocks associated with one or more second LR original frames;
 receiving metadata associated with the first and second encoded residual blocks, the metadata signalling the decoder apparatus that an encoder apparatus used a downsampling scheme of a frame-level super resolution prediction mode, carried out in-loop, for downsampling an original frame of a first resolution into the first LR original frame and the one or more second LR original frames, the first LR original frame and the one or more second LR original frames being of a second resolution that is lower than the first resolution;

based on the signalling, applying a frame-level super resolution prediction mode of decoding to the bitstream, wherein the frame-level super resolution prediction mode is carried out in-loop and comprises:

based on the signalling, using a prediction method for determining first predicted blocks, the first predicted blocks defining predictions for the first original blocks of the first LR original frame;

based on the signalling, transforming the first encoded residual blocks into first residual blocks and determining first reconstructed blocks based on the first residual blocks and the first predicted blocks, the first reconstructed blocks defining a first LR reconstructed frame;

based on the signalling, determining second predicted blocks based the first reconstructed blocks, the second predicted blocks defining predictions for the second original blocks of the one or more second LR original frames;

based on the signalling, transforming the second encoded residual blocks into second residual blocks and determining second reconstructed blocks based on the second residual blocks and the second predicted blocks, the second reconstructed blocks defining one or more second LR reconstructed frames; and based on the signalling, determining a reconstructed original video frame based on the first LR reconstructed frame and the one or more second LR reconstructed frames.

15. A non-transitory computer-readable storage medium having instructions stored thereon that, when executed by a processor of an apparatus, cause the apparatus to carry out operations including:

making a frame-level decision in-loop to apply a frame-level super resolution prediction mode of encoding to an original video frame of a first resolution, wherein the decision is made at the frame-level of one or more video frames, and wherein the frame-level super resolution prediction mode is carried out in-loop;

based on the decision, applying a downsampling scheme to the original video frame for determining a first low-resolution (LR) original frame and one or more second original LR frames, the first LR original frame and the one or more second LR original frames being of a second resolution that is lower than the first resolution;

based on the decision, partitioning the first LR original frame into first original blocks and partitioning the one or more second LR frames into second original blocks;

based on the decision, using a prediction method for determining first predicted blocks, the first predicted blocks defining predictions for the first original blocks of the first LR original frame;

based on the decision, determining first residual blocks based on the first predicted blocks and the first original blocks and, subsequently, determining first reconstructed blocks based on the first residual blocks and the first predicted blocks;

based on the decision, determining second predicted blocks based on the first reconstructed blocks, the second predicted blocks defining predictions for the second original blocks of the one or more second LR original frames;

based on the decision, determining second residual blocks based on the second predicted blocks and the second original blocks; and based on the decision, transforming the first residual blocks and second residual blocks into a bitstream, the bitstream including metadata for signalling a decoder apparatus that during the encoding a downsampling scheme was used for downsampling the video frame.

16. The method according to claim 9, wherein the bitstream is at least one of a High Efficiency Video Coding (HVEC) based bitstream, an Alliance for Open Media Video (AV1) based bitstream, or a Versatile Video Coding (VVC) based bitstream.

17. A non-transitory computer-readable storage medium having instructions stored thereon that, when executed by a processor of an apparatus, cause the apparatus to carry out operations including:

receiving a bitstream comprising first encoded residual blocks associated with a first low-resolution (LR) original frame and second encoded residual blocks associated with one or more second LR original frames;

receiving metadata associated with the first and second encoded residual blocks, the metadata signalling the decoder apparatus that an encoder apparatus used a downsampling scheme of a frame-level super resolution prediction mode, carried out in-loop, for downsampling an original frame of a first resolution into the first LR original frame and the one or more second LR original frames, the first LR original frame and the one or more second LR original frames being of a second resolution that is lower than the first resolution;

based on the signalling, applying a frame-level super resolution prediction mode of decoding to the bitstream, wherein the frame-level super resolution prediction mode is carried out in-loop and comprises:

based on the signalling, using a prediction method for determining first predicted blocks, the first predicted blocks defining predictions for the first original blocks of the first LR original frame;

based on the signalling, transforming the first encoded residual blocks into first residual blocks and determining first reconstructed blocks based on the first residual blocks and the first predicted blocks, the first reconstructed blocks defining a first LR reconstructed frame;

based on the signalling, determining second predicted blocks based the first reconstructed blocks, the second predicted blocks defining predictions for the second original blocks of the one or more second LR original frames;

based on the signalling, transforming the second encoded residual blocks into second residual blocks and determining second reconstructed blocks based on the second residual blocks and the second predicted blocks, the second reconstructed blocks defining one or more second LR reconstructed frames; and based on the signalling, determining a reconstructed original video frame based on the first LR reconstructed frame and the one or more second LR reconstructed frames.

* * * * *